United States Patent
Lee

(10) Patent No.: US 7,415,161 B2
(45) Date of Patent: Aug. 19, 2008

(54) METHOD AND RELATED PROCESSING CIRCUITS FOR REDUCING MEMORY ACCESSING WHILE PERFORMING DE/COMPRESSING OF MULTIMEDIA FILES

(75) Inventor: Heng-Kuan Lee, Taipei Hsien (TW)

(73) Assignee: Faraday Technology Corp., Hsin-Chu (TW)

( * ) Notice: Subject to any disclaimer, the term of this patent is extended or adjusted under 35 U.S.C. 154(b) by 808 days.

(21) Appl. No.: 10/708,786

(22) Filed: Mar. 25, 2004

(65) Prior Publication Data

US 2005/0213829 A1   Sep. 29, 2005

(51) Int. Cl.
G06K 9/36 (2006.01)

(52) U.S. Cl. .............. 382/239; 382/232; 382/251; 375/E7.095

(58) Field of Classification Search ................. 382/239
See application file for complete search history.

(56) References Cited

U.S. PATENT DOCUMENTS

| | | | | |
|---|---|---|---|---|
| 4,644,494 A * | 2/1987 | Muller ................. | 711/152 |
| 4,862,269 A * | 8/1989 | Sonoda et al. ............. | 348/514 |
| 4,888,645 A * | 12/1989 | Mitchell et al. ............. | 382/235 |
| 4,959,776 A * | 9/1990 | Deerfield et al. ............. | 711/217 |
| 5,233,348 A * | 8/1993 | Pollmann et al. ............. | 341/67 |
| 5,379,356 A * | 1/1995 | Purcell et al. ............. | 382/233 |
| 5,452,022 A * | 9/1995 | Yamamoto et al. ............. | 348/714 |
| 5,699,117 A * | 12/1997 | Uramoto et al. ............. | 348/390.1 |
| 5,777,812 A * | 7/1998 | Kim ................. | 360/48 |
| 5,781,242 A * | 7/1998 | Kondo et al. ............. | 348/441 |
| 5,903,310 A * | 5/1999 | Finotello et al. ............. | 375/240.25 |
| 6,370,274 B1* | 4/2002 | Peters et al. ............. | 382/234 |
| 6,389,504 B1* | 5/2002 | Tucker et al. ............. | 711/100 |
| 6,654,544 B1* | 11/2003 | Suzuki et al. ............. | 386/112 |
| 6,661,927 B1* | 12/2003 | Suarez et al. ............. | 382/240 |
| 6,778,435 B1* | 8/2004 | Han et al. ............. | 365/174 |
| 6,845,423 B2* | 1/2005 | Park ................. | 711/5 |
| 2001/0010656 A1* | 8/2001 | Mattison ................. | 365/240 |
| 2004/0083227 A1* | 4/2004 | Yocom ................. | 707/101 |

* cited by examiner

*Primary Examiner*—Samir A Ahmed
*Assistant Examiner*—Michael Vanchy, Jr.
(74) *Attorney, Agent, or Firm*—Winston Hsu

(57) ABSTRACT

Method and apparatus for reducing memory access while de/compressing multimedia files, videos, or image files. An image is divided into blocks, and a frequency data matrix corresponding to a frequency transformed and quantized block is stored in a memory for later de/compression. The method includes registering a bit plane containing a plurality of bits in a register module, wherein each bit represents whether a corresponding element of the data matrix equals zero. While accessing the memory for the data matrix, if a bit of the bit plane shows that its corresponding element of the data array is zero, the element is not accessed from the memory. In checking bits corresponding to elements not yet accessed; if these bits show that elements not accessed are all zero, accessing for the data array can be terminated without accessing them. Thus, memory access can be reduced to occupy less bandwidth of the memory.

10 Claims, 19 Drawing Sheets

Fig. 10

```
/* bit Nm0, Nm1, ... Nm7 corresponding to frequency domain data element Bm0, Bm1, ... Bm7 */ if ( Nm1|Nm2|Nm3|Nm4|Nm5|Nm6|Nm7=0 )
{ Op0=Op1=Op2=Op3=Op4=Op5=Op6=Op7=C0 }
else
{ Calculate Op by inverse One-dimensional frequency-domain transformation }
```

Fig. 19

METHOD AND RELATED PROCESSING CIRCUITS FOR REDUCING MEMORY ACCESSING WHILE PERFORMING DE/COMPRESSING OF MULTIMEDIA FILES

BACKGROUND OF INVENTION

1. Field of the Invention

The present invention provides a method and related apparatus for reducing memory accessing while de/compressing multimedia files, and more particularly, a method and related apparatus for reducing memory access by preventing access of null data in the frequency domain.

2. Description of the Prior Art

Since signal detection and processing techniques have been developed and improved upon, media signals, whether static images or motion videos, can be stored, processed, or transmitted by electronic signals with little distortion. However, in general, file sizes of multimedia files, including a variety of media information, are so large that they must be compressed properly for storing and transmitting. Consequently, compressed multimedia files should be decompressed to play. Moreover, because image data of multimedia files are rich in high-dimensional data (including two-dimensional images and/or time-domain changes), de/compression processes place high demand on system resources. Therefore, a key development issue in modern information technology is how to de/compress image data files with high efficiency and low cost.

Please refer to FIG. 1, which is a schematic diagram illustrating a typical image compression process, such as the process under MPEG protocol, or Motion Picture Expert Group. Those skilled in the art will recognize that image compression is seen as a coding process for image data, and decompression contrarily a decoding process. As FIG. 1 illustrates, a motion image data M (such as a movie or an animation) can be seen as a series of static pictures, A1, A2, A3, A4, A5, etc. Displayed different pictures as time changes, the motion image data M can be a movie. Besides, in order to increase compression rate, a process 10 undergoes an inter-coding among pictures initially to analyze each difference among pictures as the image data M is compressed; then, a process 12 takes an intra-coding process in a picture based on the outcome of the process 10.

Those skilled in the art will recognize that the differences among pictures are little when displaying a series image of running actions. For example, in FIG. 1, a movie formed by the pictures A1, A2, A3 displays a motion: an object Oj moves in the same background Bk. With exception of the object Oj position different in varied pictures, the background Bk image does not change a lot. In the process 10, a motion detection is taken to compare pictures. As FIG. 1 illustrates, the motion detection in the picture A1, A2 can roughly conclude that the object Oj moves but the background Bk does not change. Furthermore, a vector V12 is computed to represent moving direction and distance of the object Oj. In other words, the picture A2 can roughly be obtained by moving the object Oj in the picture A1 along with the vector V12, this processes being named dynamic (or action) compensation. A predictive picture of the picture A2 operated by shifting the object Oj in the picture A1 along with the vector V12 can be a prediction P2, not shown in FIG. 1. Indeed, the prediction P2 may not absolutely match the picture A2 (such as reflected light on the object Oj changes a little between the pictures A1 and A2), but their differences should not be significant. Hence, subtracting the prediction P2 from the picture A2 generates a difference picture, named difference D12. That is to say, the picture A2 can be gained by dynamically compensating the picture A1 and adding the difference D12, and this means that all image information of the pictures A1 and A2 can be contained by the picture A1, the vector V12 and the difference D12. In addition, owing to little image information in the difference D12 and slight differences between the prediction P2 and the picture A2, a high level compression is practicable, and the pictures A1, A2 are compressed.

Based on the same method, the picture A3 in FIG. 1 can be obtained from the picture A2, the corresponding vector V23, and the difference D23, so that the movie composed of a series of the pictures A1, A2, A3 can be expressed by the picture A1, the differences D12, D23 and the vectors V12, V23, thus an initial compression to the series motion image is performed. Certainly, the data image M may contain so many irrelative sequences, like pictures A4 and A5, that there might be an entirely different object moving in an entirely different background; therefore, the picture A4 is much different from the picture A3, and the motion detection is cancelled between the pictures A3 and A4, but is executed between the pictures A4 and A5 to take compression for the series image of the pictures A4 and A5 in the process 10.

After compressing/coding the differences among pictures in the process 10, the process 12 compresses/codes the pictures or the differences respectively. For example, in FIG. 1, the pictures A1, A4 and the differences D12, D23, D45 can be further compressed to increase compression rate. Please refer to FIG. 2, which illustrates a compression (or coding) process of in the process 12. To further compress a picture A (like pictures A1, A4, the differences D12, D23, etc.), the picture A is divided into a plurality of small blocks B formed by a plurality of pixels Bij. The frequency domain data matrix C containing a plurality of data elements Cij is obtained by two-dimensional frequency-domain transformations within each block B (such as discrete cosine transformation, or DCT). In other words, each data element Cij represents the quantity (i.e. the frequency domain component or coefficient) of the block B in frequency domain. Combining each Qij, the quantized data element Cij, can construct the frequency domain data matrix Q, or frequency domain matrix. Arranging each data element Qij of the data matrix Q in a specified order to be a series of one-dimensional data matrix S is called a serial scanning. Another one-dimensional data matrix R is gained after a running length coding to the data matrix S. Then, a data matrix H is generated after Huffman coding to the data matrix R. Combining data matrix H corresponding the block B finishes coding the pictures A.

In the process 12, because each block B is just a part of the picture A, values of pixel Bijs in a block B should not be significant, that is, the values of pixels in the same block tend to be similar. After the block B undergoes the frequency-domain transformation/quantization, this represents that high frequency domain quantities of the data element Cij and Qij should almost be null, or be negligible. That is to say, the frequency domain data matrix C and Q are sparse matrices. Therefore, after the one-dimensional matrix S is scanned and arranged from the data matrix Q, data elements Sks (each equals to one data element Qij) of the data matrix S are among many null values. As the data matrix S undergoes the running length coding, numbers of null data elements between two non-null data elements Sks are coded to reduce the length of the data matrix S. For example, when ten null data elements exist between two non-null data elements Si and Sj, it does not store the ten null data elements between Si and Sj, but records the number of ten null data elements by the running length coding to the data element Sj. So, the bit length of the data matrix R generated from the running length coding of the data matrix S can be reduced a lot. After Huffman coding, the bit length of the data matrix R is further compressed, and a data matrix H is generated. Combining each data matrix H generated from the compression of each block B, the compressed picture of the picture A becomes a multimedia file.

Obviously, if the image data is static, it undergoes the process 12 without the process 10, such as a joint Photographic Experts Group, or JPEG, process. Please refer to FIG. 2 (and FIG. 1) again. The decompression process is basically the reverse of the compression process. The data matrix H of a compressed multimedia file is decompressed to the data matrix S, and then is arranged to the two-dimensional data matrix Q (named inverse scanning). Dequantizing the data matrix Q obtains the frequency domain data matrix C. The block B can be obtained by taking an inverse discrete cosine transformation to the data matrix C. Combining varied blocks B obtains the picture A. If the original image data is a motion image data, the original motion image data can be combined by dynamically compensating the picture A, thereby finishing the decompression (or decoding).

Please refer to FIG. 3 illustrating a function block diagram of a prior art processing circuit 20. The processing circuit 20 performs de/compression (or de/coding) for image data, and includes a central processing unit 14, a memory access module 16, a dynamic estimation module 18, a frequency-domain transformation/quantization module 22, an inverse frequency-domain transformation/dequantization module 24, and an inner memory 28 (such as random access memory). The central processing unit 14 controls operations of processing circuit 20. The memory access module 16 can achieve the function of direct memory access, or DMA, so that the processing circuit 20 can access an outer memory 26 (such as loading the image data waiting for compression from the outer memory 26). In the process 10 shown in FIG. 1, the dynamic estimation module 18 can take dynamic estimation. In the process 12 in FIG. 1, the frequency-domain transformation/quantization module 22 can achieve frequency-domain transformation and quantization. Contrarily, the inverse frequency-domain transformation/dequantization module 24 can recover compressed multimedia files from one-dimensional data matrixes to two-dimensional blocks in order to decompress (decode) and generate each picture. To support operations of each module in the processing circuit 20, the processing circuit 20 also includes an inner memory 28 to register data for the operations of each module.

For example, when image data compression (coding) is performed by the prior art processing circuit 20, the frequency-domain transformation/quantization module 22 transforms/quantizes the block B of each picture (please refer to FIG. 2) to the two-dimensional data matrix Q, and each data element Qij of the data matrix Q is written (stored) into the inner memory 28 sequentially. Progressing to serial scanning, each data element of the data matrix Q is read from the inner memory 28 sequentially and forms a one-dimensional data matrix S. Then, the next block B is processed.

In summary, it is necessary to access the inner memory 28 frequently in the prior art processing circuit 20. As FIG. 1 and FIG. 2 show, a data image M may include a lot of pictures A, and a picture A contains a lot of blocks B each corresponding to the frequency domain data matrix Q. When the processing circuit 20 compresses images, each data element Qij of the data matrix Q is stored into the inner memory 28 one by one. Besides, when serial scanning, each data element Qij is read sequentially. Actually, as mentioned above, the frequency domain matrix Q might be a sparse matrix, which means that most data elements Qij are nulls, and this is the reason that the running length coding can reduce the length of the matrix S in that the data matrix R only records the number of null data elements after running length coding, instead of arranging these null data element exactly in the data matrix R. However, when the prior art processing circuit 20 accesses the data matrix Q from the inner memory 28, there is no better way to utilize characters of a sparse matrix, but to access each data element Qij one by one. As a result, the processing circuit 20 needs to access its inner memory 28 frequently in the de/coding process, so that its occupied memory resources cannot be reduced effectively. In achieving the function of high speed de/compression, the processing circuit 20 should use high frequency inner memory (that is, it must access more data in a unit of time), so that the cost of circuit design and manufacture cannot be reduced.

SUMMARY OF INVENTION

It is therefore a primary objective of the claimed invention to provide a method and related processing circuits that can de/compress image data without frequently accessing memory in order to solve the above-mentioned problems.

According to the claimed invention, a method includes obtaining a data matrix made up of a plurality of data elements; and constructing a reference matrix based on the data matrix, so that the reference matrix includes a plurality of reference elements each corresponding to a data element, and each reference element represents whether its corresponding data element fits a default or not. Finally, the method also includes taking a decision step to each data element when the data matrix is written into a memory, so that when a reference element corresponding to a data element represents that the data element fits the default, the data element is prevented from being written into the memory.

These and other objectives of the claimed invention will no doubt become obvious to those of ordinary skill in the art after reading the following detailed description of the preferred embodiment that is illustrated in the various figures and drawings.

BRIEF DESCRIPTION OF DRAWINGS

FIG. 9 to FIG. 11 are three types of different scanning sequences when the processing circuit processes the serial scanning in FIG. 4.

FIG. 19 is a schematic diagram of an algorithm when the processing circuit in FIG. 17 processes the one-dimensional inverse frequency-domain transformation.

DETAILED DESCRIPTION

Figure 1:
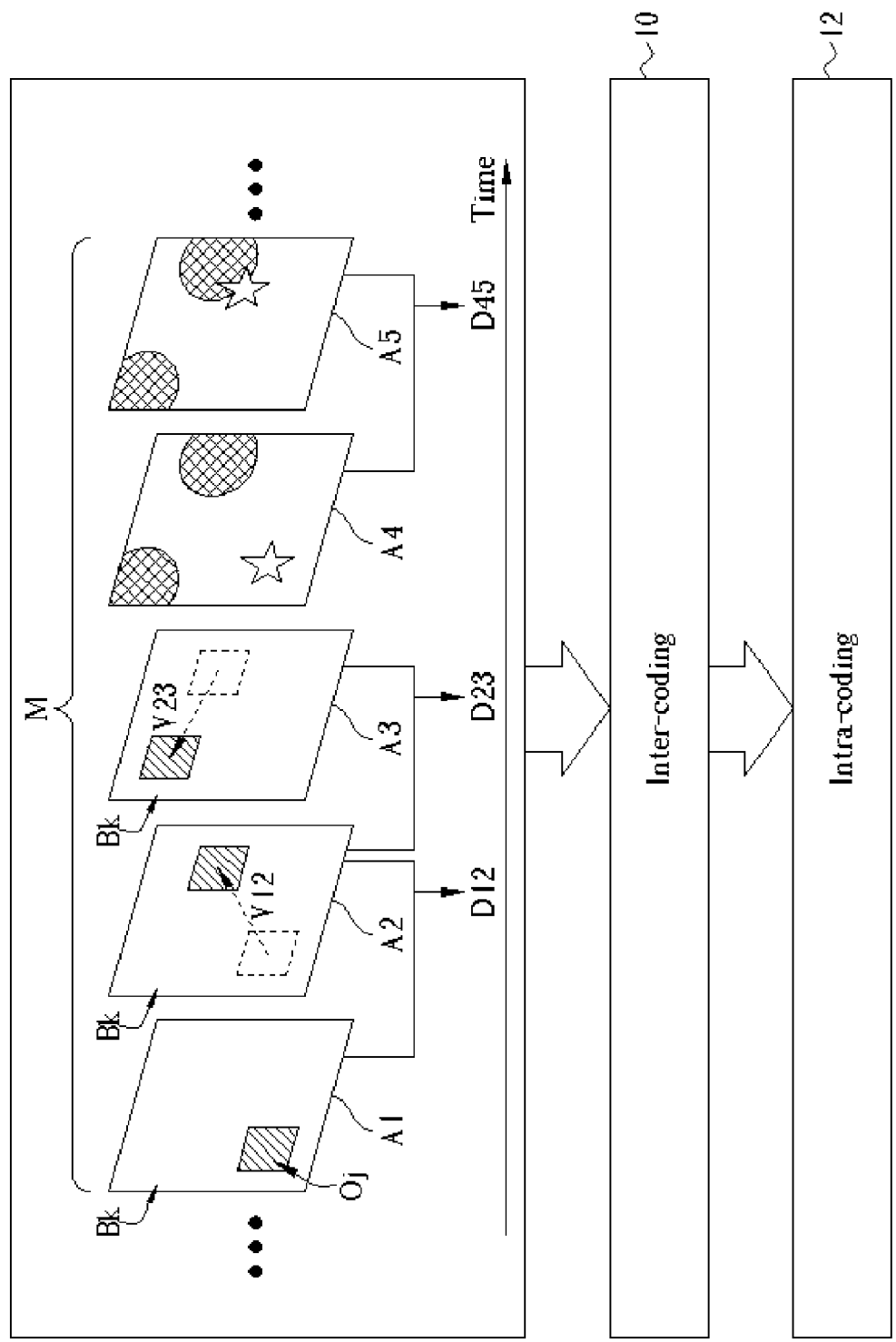
FIG. 1 is a schematic diagram of typical image data compression.
Figure 2:
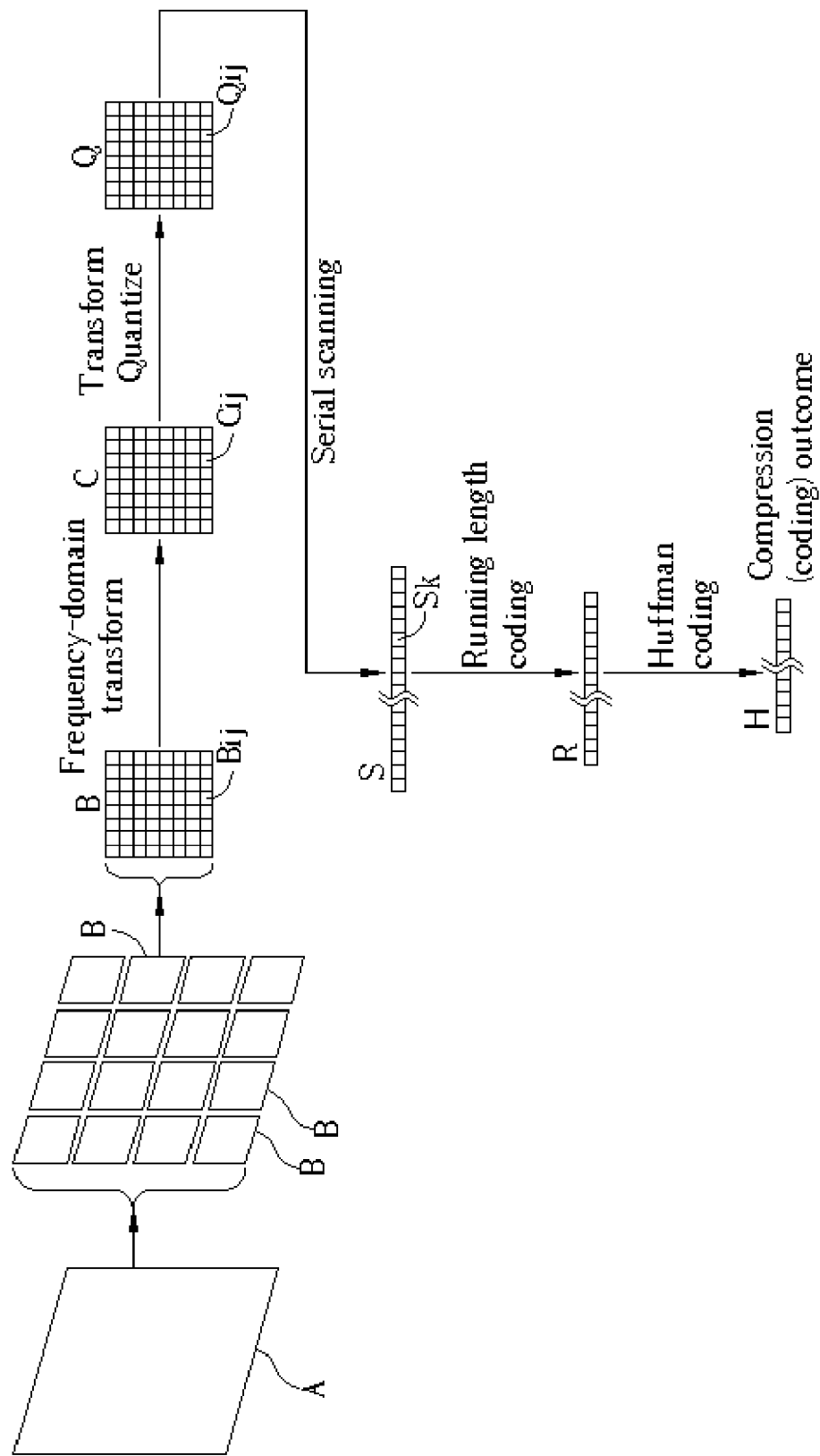
FIG. 2 illustrates each compression step of each picture in FIG. 1.
Figure 4:
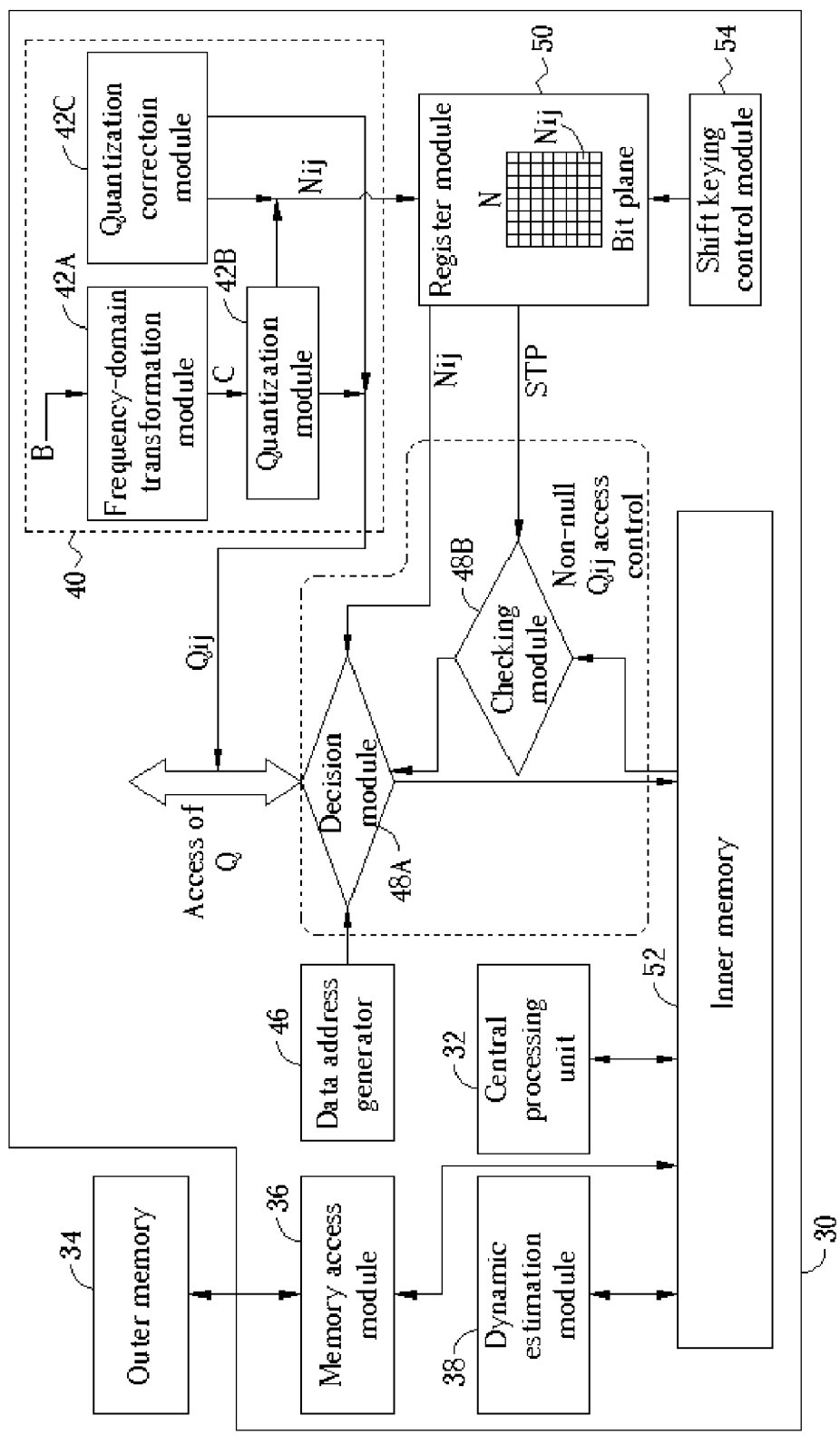
FIG. 4 is a function block diagram of the present invention.

Please refer to FIG. 4, which illustrates a function block diagram of the present invention, an implementation of the processing circuit 30. The processing circuit 30 can compress image data (or code the image data to a smaller size file), and includes: a central processing unit 32, a memory access module 36, a dynamic estimation module 38, a inner memory 52, a frequency-domain transformation/quantization module 40. In order to achieve the present invention, the processing circuit 30 further includes: a data address generator 46, a decision module 48A, a checking module 48B, a register module 50, and a shift keying control module 54. The central processing unit 32 controls operations of the processing circuit 30, and the memory access module 36 directly accesses an outer memory 34. The dynamic estimation module 38 can perform dynamic estimation. The frequency-domain transformation/quantization module 40 includes: a frequency-domain transformation module 42A, a quantization module 42B, and a quantization correction module 42C. The frequency-domain transformation module 42A transforms a block B (please refer to FIG. 2) to a frequency domain data matrix C by frequency-domain transformation (such as discrete cosine transformation), and the quantization module 42B quantizes the frequency domain data matrix C to a quantized frequency domain data matrix Q. The quantization correction module 42C can achieve AC/DC predictions to properly correct the outcome of the quantization module 42B. All in all, the frequency-domain transformation/quantization module 40 performs the frequency-domain transformation/quantization for the block B of the picture to generate the quantized frequency domain data matrix Q. Furthermore, the inner memory 52 supports operations of each above-mentioned module by storing data for the operations.

In order to control access of the quantized frequency domain data matrix Q to the inner memory 52, the register module 50 of the present invention registers a bit plane N as a reference matrix. The bit plane N is a two-dimensional reference matrix, which includes a plurality of one-bit reference elements Nij each corresponding to a data element Qij of the data matrix Q, and it uses digital "0" and "1" to represent whether values of the data element Qij are zero (null) or not. Because each reference element Nij is only a one-bit data, the register module 50 can be simply achieved by a shift register; the shift keying control module 54 can control bit shifts of the register module 50 to access each value of the bit Nij. The decision module 48A and the checking module 48B can control the data matrix Q in accessing the inner memory 52 based on each bit Nij of the bit plane N.

Figure 5:
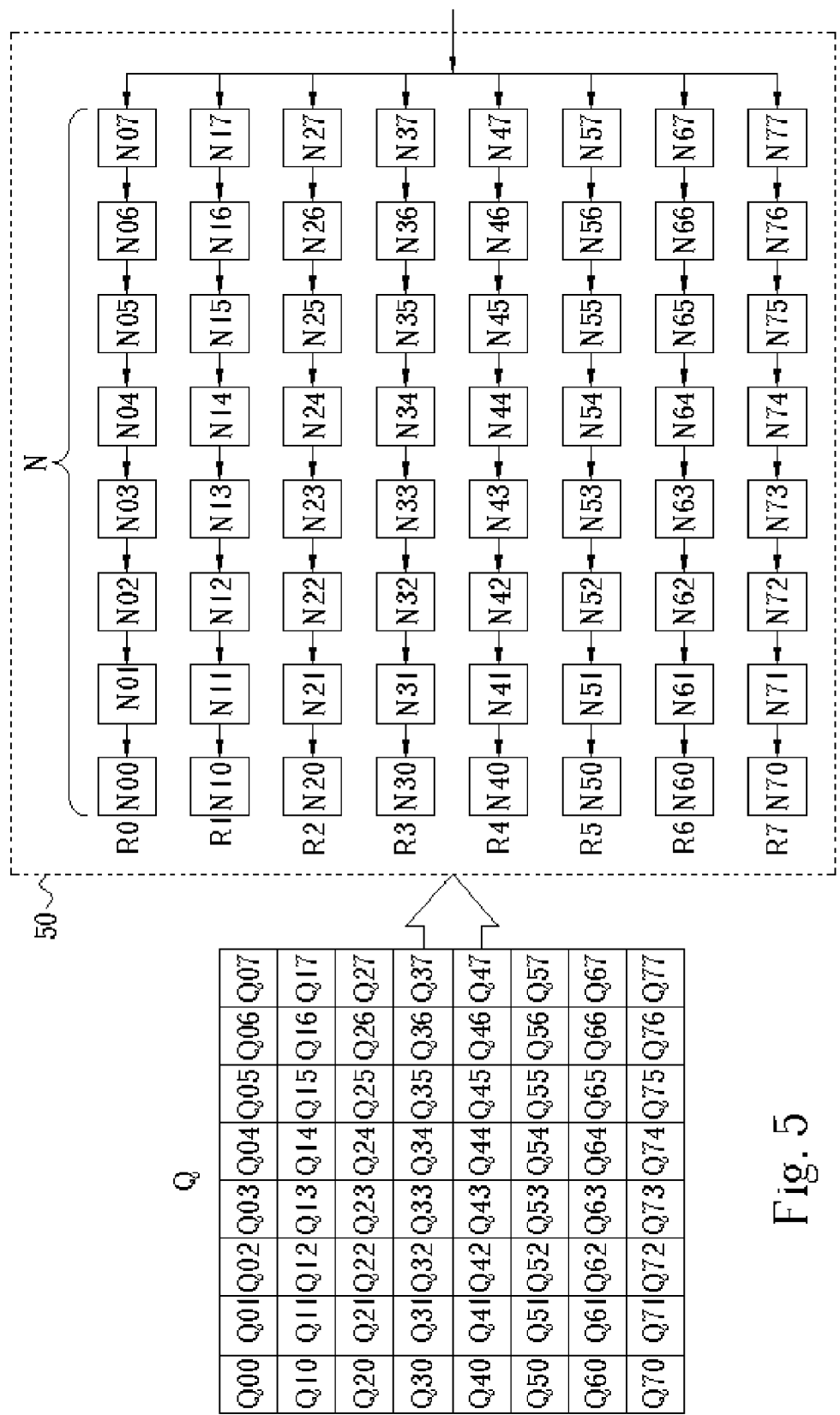
FIG. 5 depicts a schematic diagram of a bit plane stored in a register module in FIG. 4.

Please further refer to FIG. 5 (and FIG. 4) to see the register configuration of the bit plane N in the register module 50. FIG. 5 illustrates an implementation diagram of the bit plane N configuration in the present invention. In present image compression standards (such as MPEG), a block B contains 8*8 pixels. In this situation, the quantized frequency domain data matrix Q also contains 8*8 data elements, so that the bit plane N should have 8*8 bits correspondingly. In the present invention, the register module 50 can achieve eight 8-bit shift registers with a 1-bit shifter. As illustrated in FIG. 5, the quantized frequency domain data matrix Q includes 8*8 data elements Q00-Q07, Q10-Q17 . . . Q70-Q77. Contrarily, the bit plane N also includes 8*8 bits N00-N07, N10-N17 . . . N70-N77; the bit N00-N07 forms a row R0, the bit N10-N17 forms a row R1, and so on.

Figure 6:
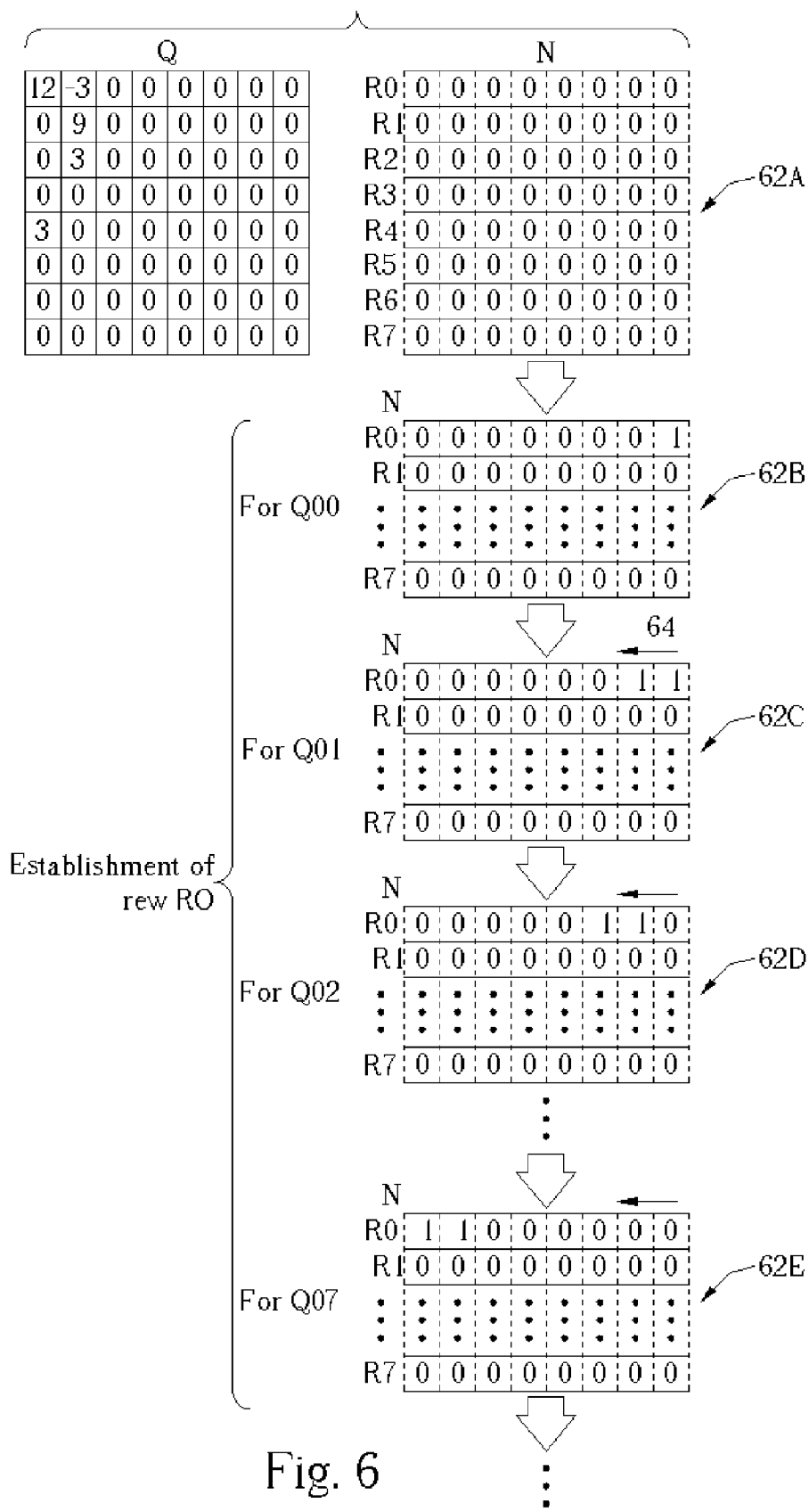
FIG. 6 illustrates that the processing circuit in FIG. 4 generates the bit plane according to a frequency domain data matrix.

As to implementing processes of image data compression in the present invention, it can be discussed in two aspects. First of all, after the frequency-domain transformation/quantization module 40 generates the data matrix Q, the data matrix Q is stored (written) into the inner memory 52. In this process, the present invention can construct a corresponding bit plane N based on each data element Qij; meanwhile, the decision module 48A can determine that its corresponding data element Qij should be written into the inner memory 52 according to the value of each bit Nij. Please refer to FIG. 6 (also FIG. 4 and FIG. 5), which illustrates the control of the decision module 48A on writing the data element when the present invention stores the quantized frequency domain data matrix Q into the inner memory 52. As mentioned above, the data matrix Q is a sparse matrix and its data elements are almost all null. For example, after the frequency-domain transformation/quantization module 40 finishes its operations, it generates the quantized frequency domain data matrix Q as shown in FIG. 6, the data elements Q00, Q01, Q11, Q21, and Q40 are non-null while the others are all null. As step 62A is illustrated in FIG. 6, before the data matrix Q is stored into the inner memory 52, its corresponding bit plane N is not yet constructed, and each bit of the corresponding bit plane N is reset as digit "0". In the implementation of FIG. 6, it is assumed that each bit Nij of the bit plane N represents nulls of its corresponding data element Qij by digit "0", and non-nulls by digit "1".

After the frequency-domain transformation/quantization where module 40 finishes quantizing the first data element Q00 of the data matrix Q, a bit in its corresponding bit plane should be digit "1" for its non-null quantized value, and in step 62B shown in FIG. 6, the digit "1" registers into the most right bit of the row R0 by one bit shift. At the same time, the decision module 48A follows the non-null value of the data element Q00 by the digit "1", so that the data element Q00 is written into the inner memory 52. In step 62C, after the frequency-domain transformation/quantization module 40 continues quantizing subsequent data elements and generating the data element Q01, another digit "1" is needed in the bit plane N for the quantized value is also non-null, and this digit "1" is stored into the rightmost bit of the row R0 by bit shift. Therefore, the former digit "1" corresponding to the data element Q00 shifts one bit to the left side (along with the arrow 64). Meanwhile, the decision module 48A makes the non-null data element Q01 written into the inner memory 52 a digit "1" corresponding to the data element Q01.

In step 62D, the frequency-domain transformation/quantization module 40 generates the third quantized data element Q02, a digit "0" is stored into the rightmost bit of the row R0 by a one bit shift for its null quantized value. The two digit "1"s corresponding to the data elements Q00, Q01 continue shifting one bit to the left side. The decision module 48A does not write the data element Q02 into the inner memory 52 based on the digit "0" corresponding to the data element Q02 to reduce access time to the inner memory 52.

According to similar steps, when the frequency-domain transformation/quantization module 40 outputs quantized data elements Q03 to Q07 in turn, each bit in the bit plane N corresponding to the data element is stored into the row R0 by bit shifts, and the decision module 48A can determine whether the data element be written into the inner memory 52 based on each bit corresponding to the data element. In step 62E, the frequency-domain transformation/quantization module 40 generates the quantized data element Q07, and its corresponding digit "0" is also stored in the row R0 by one bit shift; the decision module 48A therefore does not make the data element Q07 written into the inner memory 52. To this point, the frequency-domain transformation/quantization module 40 has already outputted all data elements Q00 to Q07 of the first row of the data matrix Q, so that a row R0 of the bit plane N has been established. Following that, the frequency-domain transformation/quantization module 40 continues outputting the data elements Q10 to Q17 of the second row of the data matrix Q, and a row R1 of the bit plane N records bits each corresponding to the data element by bit shifts, so that the decision module 48A controls the inner memory 52 to access these data elements. By this method, after the frequency-domain transformation/quantization module 40 outputs all data elements of the quantized frequency domain data matrix Q, the bit plane N is established. Please refer to FIG. 7 (also FIG. 4 and FIG. 6). Following the implementation in FIG. 6, FIG. 7 illustrates a schematic diagram after the establishment of the bit plane N; each bit Nij corresponds to one data element Qij of the data matrix Q.

Figure 7:
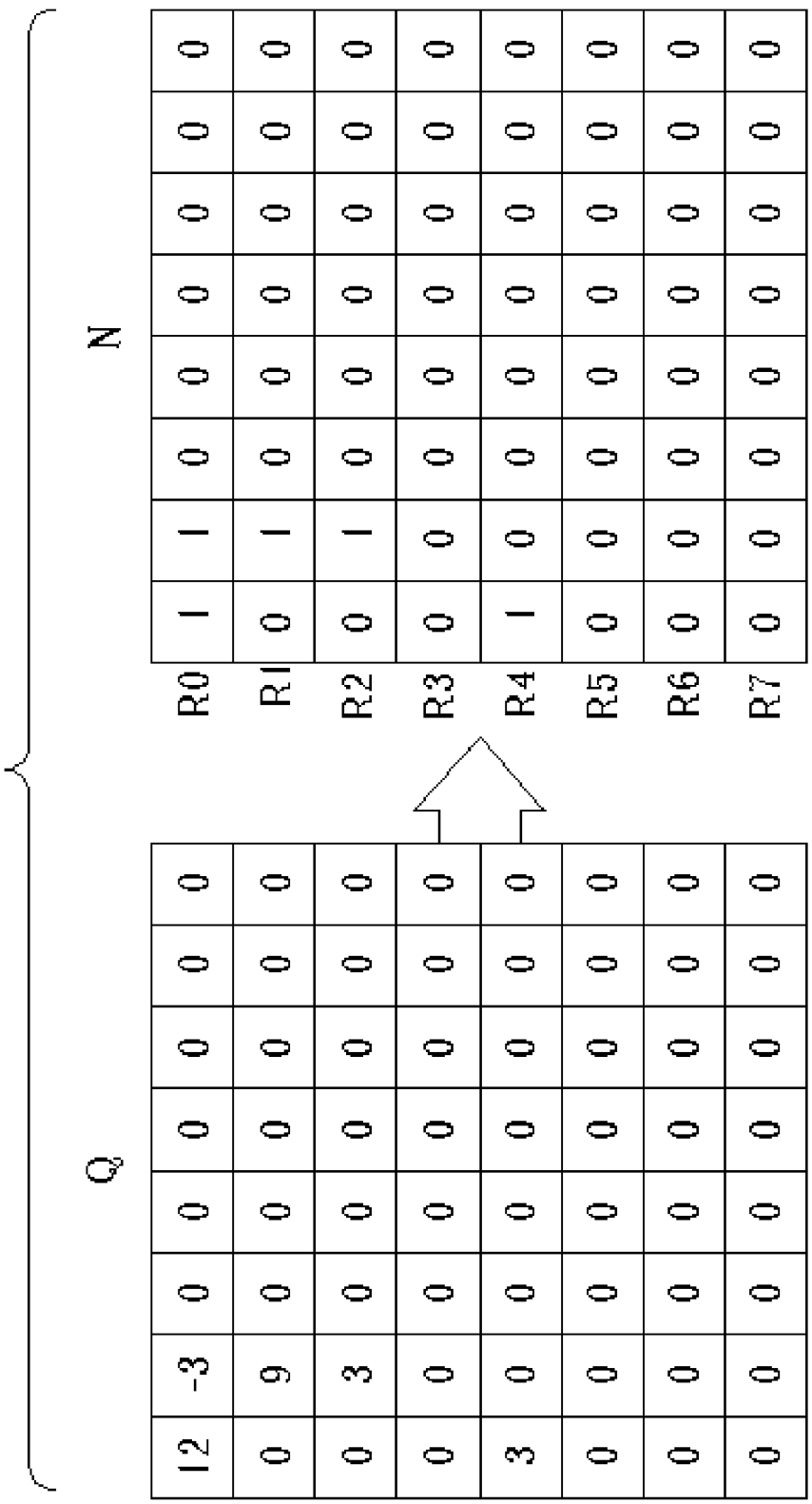
FIG. 7 is a schematic diagram of the generated bit plane of FIG. 6.

In the implementation of the present invention in FIG. 6 and FIG. 7, owing to only five non-nulls in the data matrix Q, the inner memory 52 should be accessed for five times when the whole data matrix Q is stored into the inner memory 52. In comparison, the prior art processing circuit, which does not undergo the null/non-null decision when storing the data matrix Q, so that even if the data element Qij is null, it should be written into the inner memory, which occupies a lot of memory resources. Moreover, even if the data element Qij is null, it does not represent that this data element Qij is only one digit "0" data for the data element Qij should record its value by a few bits, and it also represents that the present technique needs a lot of memory resources to access null data element Qij.

Figure 8:
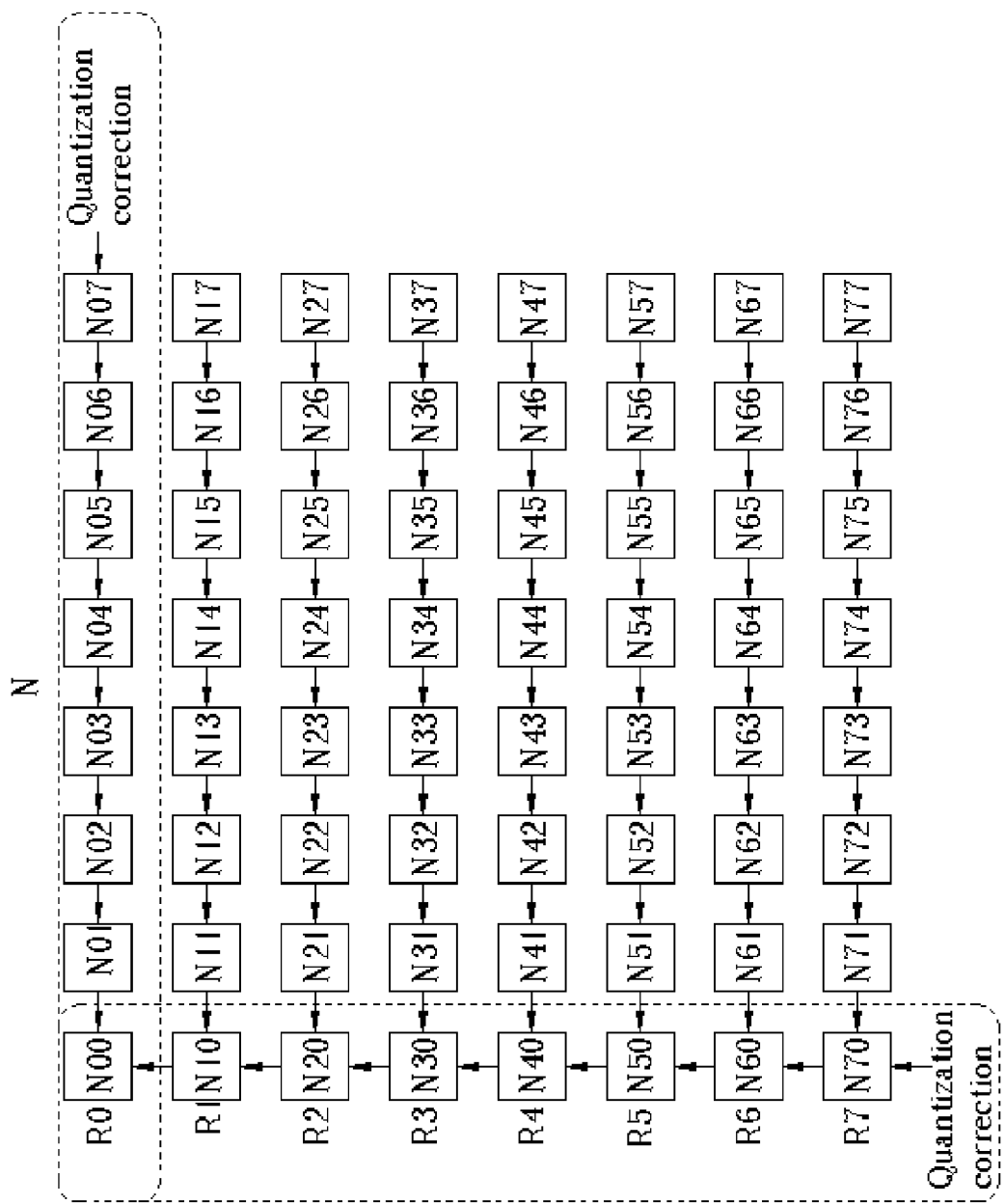
FIG. 8 is a schematic diagram of the quantization correction process of the register module in FIG. 4.

In some cases (for example, when going to alternating/direct current prediction), the quantization correction module 42C corrects some data element Qij (such as changing non-nulls to nulls in reasonable situations), or corrects bits corresponding to the bit plane N based on the corrected outcome of the quantization correction module 42C at the same time. Please refer to FIG. 8. FIG. 8 illustrates a schematic diagram showing the present invention register module 50 correcting the bit plane N. This correction usually involves the data elements Q00 to Q07 and Q00 to Q70, so that it can correct each bit corresponding to each data element at the same time by bit shifts based on the illustration in FIG. 8.

Figure 9:
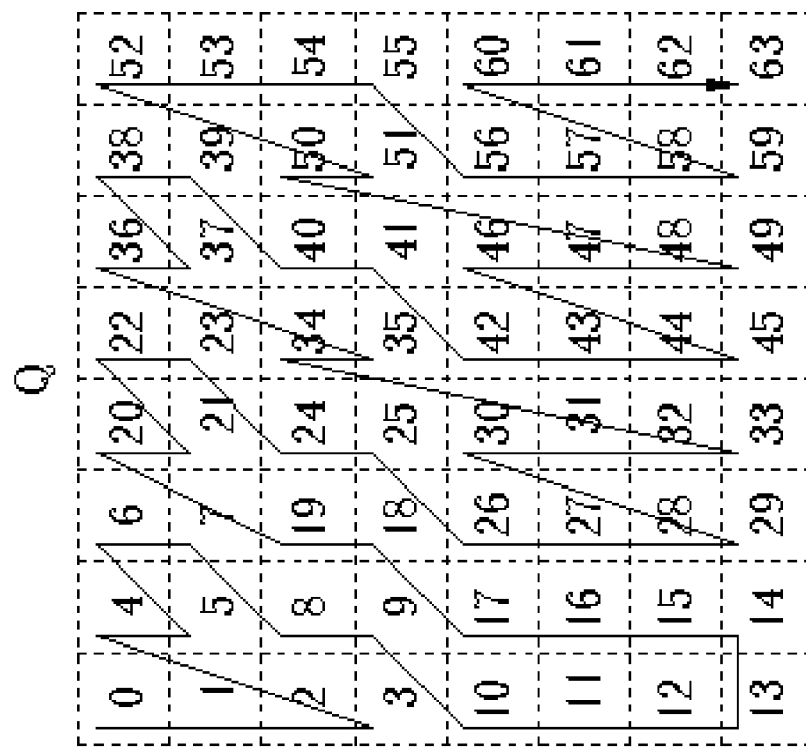
Figure 10:
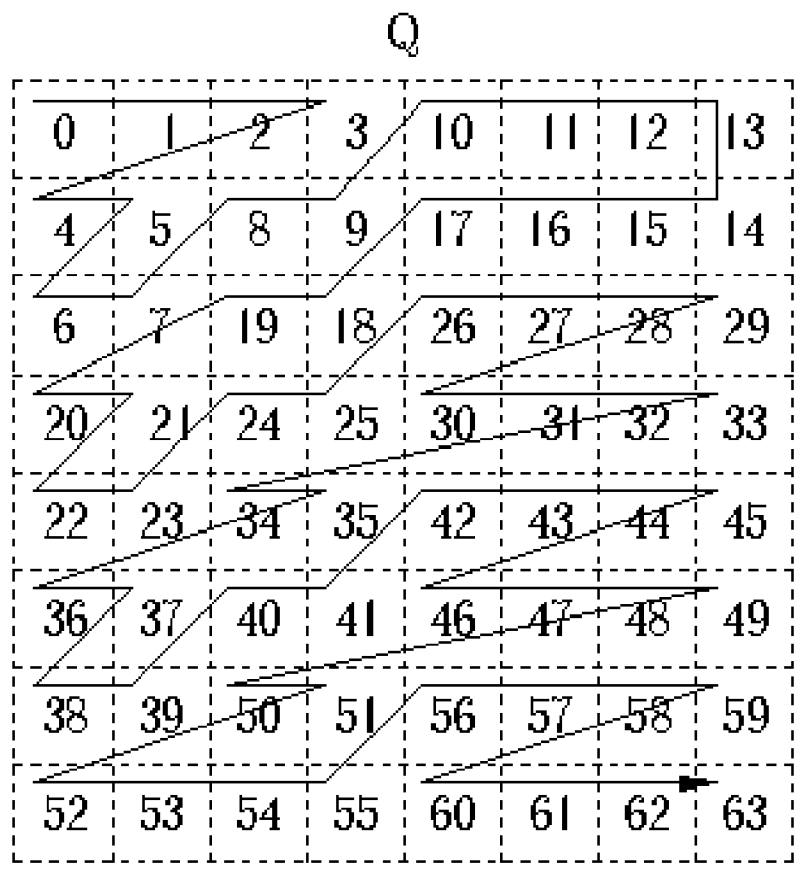
Figure 11:
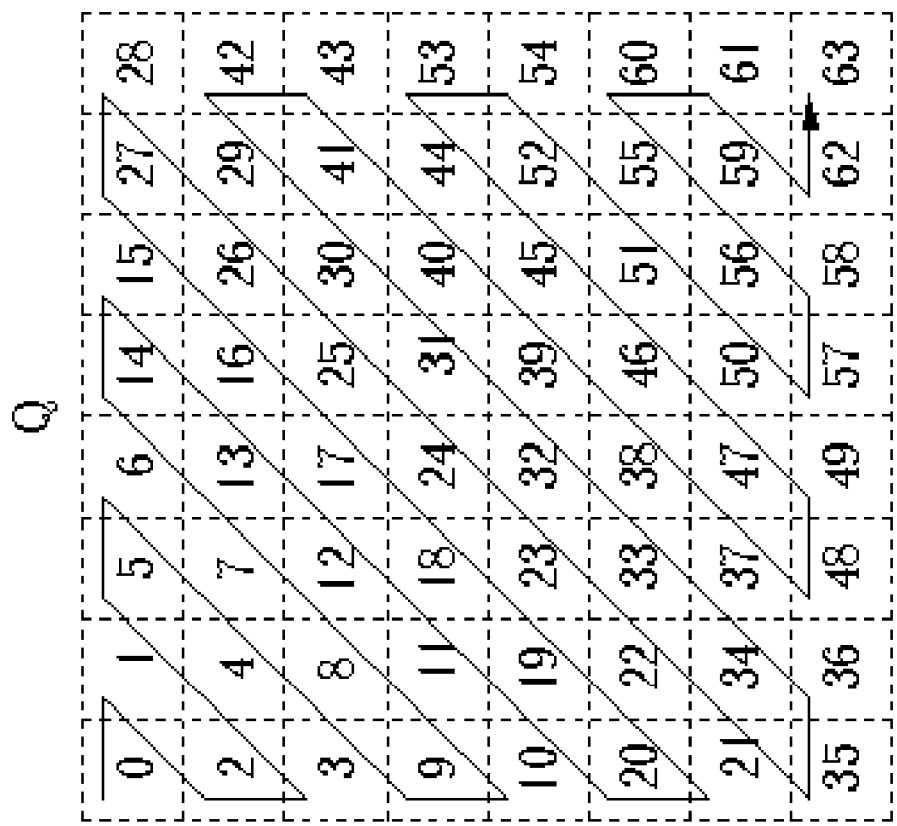

After non-null data elements of the data matrix Q are stored into the inner memory 52 and a corresponding bit plane N is established, the present invention can control access to the data matrix Q based on information of the bit plane N as the data matrix Q is read out. As discussed in FIG. 2 and related statements, the quantized frequency domain data matrix Q is read out from the inner memory to undergo a serial scanning, and each data element of the two-dimensional data matrix Q is arranged into an one-dimensional data matrix based on a specified order. Please refer to FIG. 9 to FIG. 11 (and FIG. 5). In typical image data de-/compression standards, there are three commonly used serial scanning sequences, which are alternate vertical scanning, alternate horizontal scanning, and zig-zag scanning; the scanning sequences of these three type are shown in FIG. 9 to FIG. 11. From FIG. 9 to FIG. 11, each data element Qij of the data matrix Q note is marked with a symbol to represent scanning sequence of the data element; the smaller the symbol, the earlier scanning time. For example, in FIG. 9, each data element Qij is arranged in an one-dimensional matrix by an order: Q00, Q10, Q20, Q30, Q01, Q11, Q02, Q12, Q21, Q31, Q40, Q50, Q60, Q70, Q71, Q61, and etc. to Q47, Q57, Q67, Q77. In FIG. 10, each data element Qij is arranged in a one-dimensional matrix by an order: Q00, Q01, Q02, Q03, Q10, and etc. to Q74, Q75, Q76, Q77.

In general, within the quantized frequency domain data matrix Q, the data element Q00 represents a direct current quantity of its corresponding block B in frequency domain (therefore, it is also named as direct-current frequency-domain element); contrarily, other data elements are alternating current quantities in frequency domain (also named alternating-current frequency-domain element). In the data matrix Q, data elements far away from the data element Q00 (such as data elements in the lower-right corner of the matrix Q) may be nulls as their corresponding frequency goes higher. Therefore, when arranging each data element of the data matrix Q in a one-dimensional matrix, the scanning sequences of FIG. 9 to FIG. 11 start near the upper-left corner data element (data elements near the data element Q00) to facilitate the following running length coding.

In the present invention, when reading each data element of the data matrix Q stored in the inner memory 52 by the scanning sequence, each bit corresponding to the bit plane N can also be accessed by the scanning sequence to determine whether it needs to read corresponding data elements from the inner memory 52 based on bit values. Furthermore, the present invention can check nulls of other data elements (not yet read) when reading frequency domain data elements; if the other data elements are all nulls, the data elements are prevented from being read directly and quickly to reduce the inner memory 52 access time. To realize the above checking step, the checking module 48B of the present invention (shown in FIG. 4) processes an "OR" operation to every bit of the bit plane N to gain a flag STP (that is: STP=!(R0 IR1 IR2 IR3 IR4 IR5 IR6 IR7)), and determines if the scanning step finishes according to the flag STP.

Figure 12:
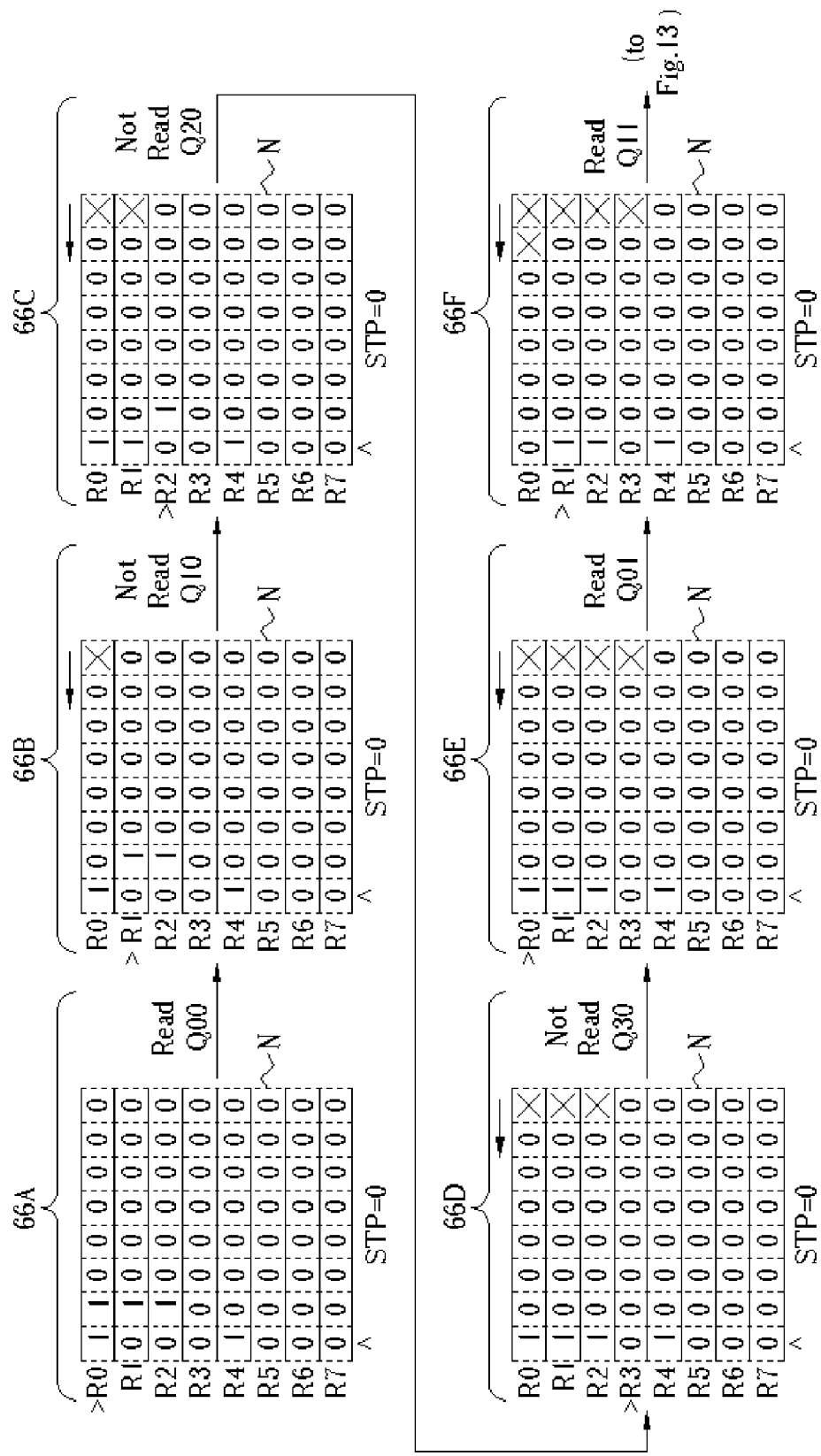
FIG. 12 and FIG. 13 illustrate the refresh process of its corresponding bit plane when the processing circuit in FIG. 4 takes the serial scanning for the frequency domain data matrix in FIG. 6.
Figure 13:
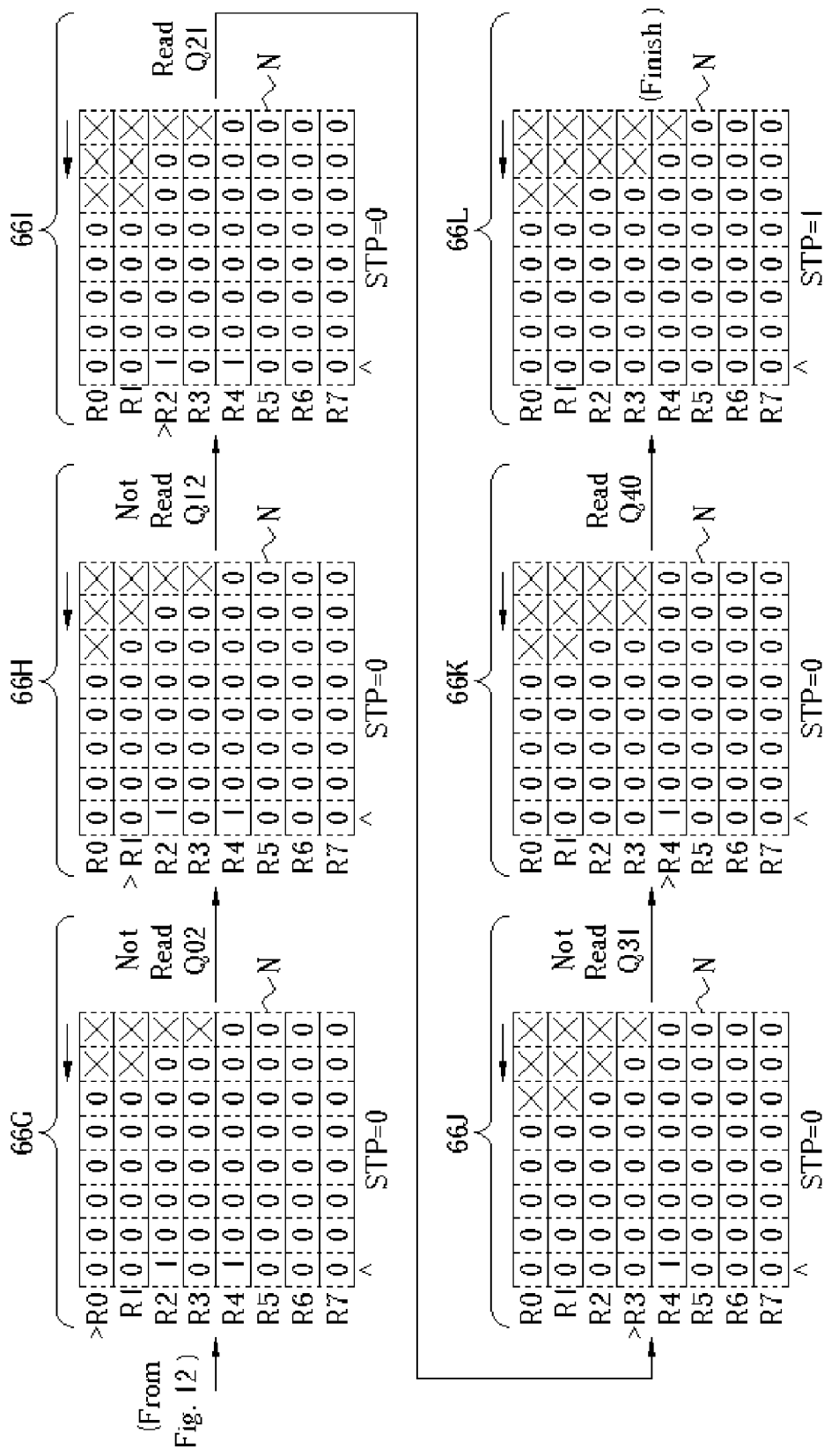

Please refer to FIG. 12 and FIG. 13 (also FIG. 4, FIG. 7, and FIG. 9) illustrating the situation when the present invention processes the serial scanning. Continuing with the implementation in FIG. 7, if the data matrix Q and its corresponding bit plane N are as shown in FIG. 7, the data matrix Q undergoes the serial scanning by the order of FIG. 9. As step 66A in FIG. 12 shows, before the serial scanning starts, the bit plane N is as illustrated in FIG. 7. After the serial scanning starts, owing to the digit "0" of the flag STP (there are digit "1"s in the bit plane N), the checking module 48B decides to scan. According to the scanning sequence (as FIG. 9 illustrates), the checking module 48B should gain a value of the data element Q00 first, and then the decision module 48A determines if it should read the data element Q00 from the inner memory 52 based on the first bit of the row R0 (the leftmost side bit). Because the first bit of the row R0 is digit "1" the data element Q00 is non-null, so that the decision module 48A decides that the data element Q00 should be read from the inner memory 52. After reading the data element Q00, the shift keying control module 54 (in FIG. 4) shifts each bit of the row R0 one bit to left side, and the most right bit stores a digit "0" (it is also the "X" bit in FIG. 12) as shown in step 66B. The bit shifting represents that the bit corresponding the data element Q00 in the row R0 has been properly handled.

In step 66B, the checking module 48B does not stop serial scanning as the flag STP is still digit "0" (wherein bit noted as "X" is digit "0"). According to the scanning sequence shown in FIG. 9, it should gain the value of the data element Q10, so that the decision module 48A determines whether the data element Q10 should be read based on the leftmost side bit of the row R1 (the bit corresponding to the data element Q10). Because the bit is digit "0", the decision module 48A decides not to read the data element Q10 from the inner memory 52 (in fact, the inner memory 52 need not store the null data element Q10), and can cooperate with the data address generator 46 to deal with the data element Q10 to reduce access to the inner memory 52. After the decision to read the data element Q10, the row R1 in the bit plane N shifts one bit to the left and stores a digit "0" in the rightmost side (noted as "X") to represent that the bit corresponding the data element Q10 in the row R1 has been properly handled. The bit plane N after bit shifts is as shown in step 66C.

In step 66C, the checking module 48B continues serial scanning for the flag STP is still digit "0" (wherein two bits noted as "X" are digit "0"s). According to the scanning sequence shown in FIG. 9, reading of the data element Q20 is performed, and the decision module 48A decides not to read the data element Q20 as the first bit of the row R2 is digit "0". After the decision to read the data element Q20, the row R2 of the bit plane N shifts one bit to left side and stores a digit "0" in the rightmost side (noted as "X"), which becomes the illustration in step 66D.

Similarly, in step 66D, the flag STP is still digit "0", so that the data element Q30 undergoes the serial scanning, and the decision module 48A decides not to read the data element Q30 as the first bit of the row R3 is digit "0". After the decision to read the data element Q30, the row R3 shifts one bit to left side and stores a digit "0" (noted as "X"), which becomes the illustration in step 66E.

In step 66E, the flag STP is digit "0", so that the data element Q01 undergoes the serial scanning (as FIG. 9 illustrates). Because the first bit of the row R0 (after the bit shifts in step 66A, the bit corresponds to the data element Q01) is digit "1", the decision module 48A decides the data element Q01 should be read from the inner memory 52. After it completes dealing with the data element Q01, the row R0 shifts one bit to the left and stores a digit "0" (noted as "X"), as related by the illustration in step 66F.

As the serial scanning continues, processed data elements increase, and there should be more and more digit "0"s in the bit plane N since bits corresponding to processed data elements are noted as digit "0" (or the "X"). As shown in step 66F to 66J (from FIG. 12 to FIG. 13), after each data element undergoes the serial scanning, rows with corresponding bits in the bit plane N record a digit "0" (or the "X") by bit shifts, so that the checking module 48B can decide whether the serial scanning should continue based on the bit plane N after bit shifts.

As FIG. 13 illustrates, in step 66K, the serial scanning goes to the data element Q40, and the decision module 48A decides the data element Q40 should be read from the inner memory 52 based on the first bit of the row R4; the row R4 of the bit plane N record a digit "0" (where noted the "X") by bit shifts to left side, which becomes the illustration in step 66L. In step 66L, owing to all bits in the bit plane N being digit "0"s, there is no unprocessed data elements, and the flag STP changes to digit "1", so that the checking module 48B finishes the serial scanning based on the flag STP.

Figure 3:
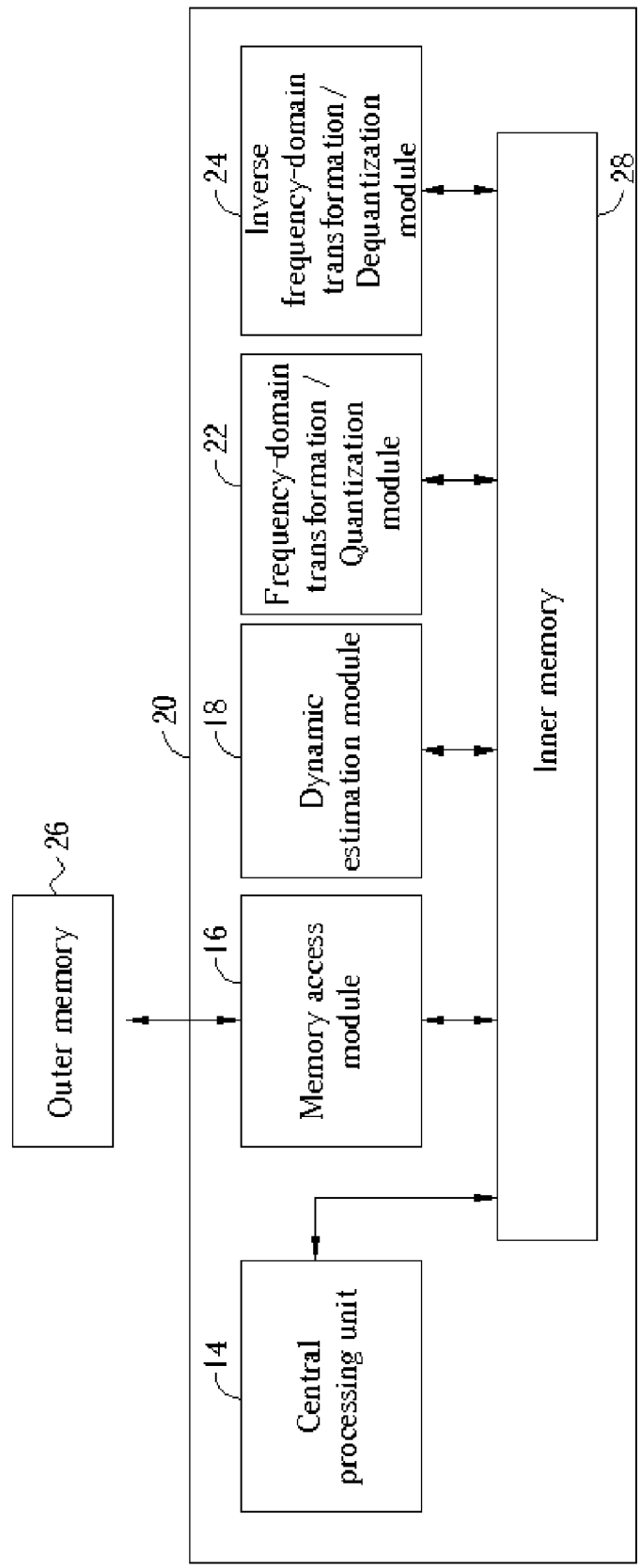
FIG. 3 is a function block diagram of a prior art processing circuit of image data de/compression.

In other words, when the serial scanning goes to each data element one by one, there are two mechanisms in the present invention to reduce access to the inner memory. One is operation of the decision module 48A, which only accesses non-null data elements. The other mechanism is operation of the checking module 48B, which determines nulls of un-processed data elements based on the flag STP. If all of them are nulls, it can finish the serial scanning directly and quickly without accessing the left null data elements to the inner memory 52. By the bit plane N registered in the register module 50, the present invention can determine a null of each data element quickly without accessing the inner memory. In comparison with the prior art technique shown in FIG. 3, owing to lack of the above mechanisms to determine null of each data element, when processing the serial scanning, the prior art must read all data elements in the data matrix, no matter how many are nulls. Therefore, the prior art technique wastes a lot of memory resources.

As implementations of FIG. 12 and FIG. 13 illustrate, after processing each data element, the present invention shifts one bit to the left side of the same row to refresh the bit plane, and shifts the second bit in the same row to the leftmost side (also the first bit of the row), so that the decision module 48A can decide null by the leftmost bit of the corresponding row when the second data element of the same row undergoes the access decision. As step 66A, 66E, and step 66G illustrate in FIG. 12 and FIG. 13, in step 66A, the bit corresponding to the data element Q01 shifts to the leftmost side of the row R0, so that the decision module 48A can decide null of the data element Q01 (in the same row of the data element Q00) based on the left-most side bit of the row R0 in step 66E. In step 66E, the bit corresponding to the data element Q02 shifts to the leftmost side of the row R0 again. In step 66G, the decision module 48A decides null of the data element Q02 (in the same row of the data element Q00 and Q01) based on the most left side bit of the row R0. Observing the scanning sequences in FIG. 9 and FIG. 11, the scanning order of each data element is prior to its right side data element for the same row data elements, so that the bit shifts toward left side in FIG. 12 and FIG. 13 can fit the scanning sequences in FIG. 9 and FIG. 11.

Figure 14:
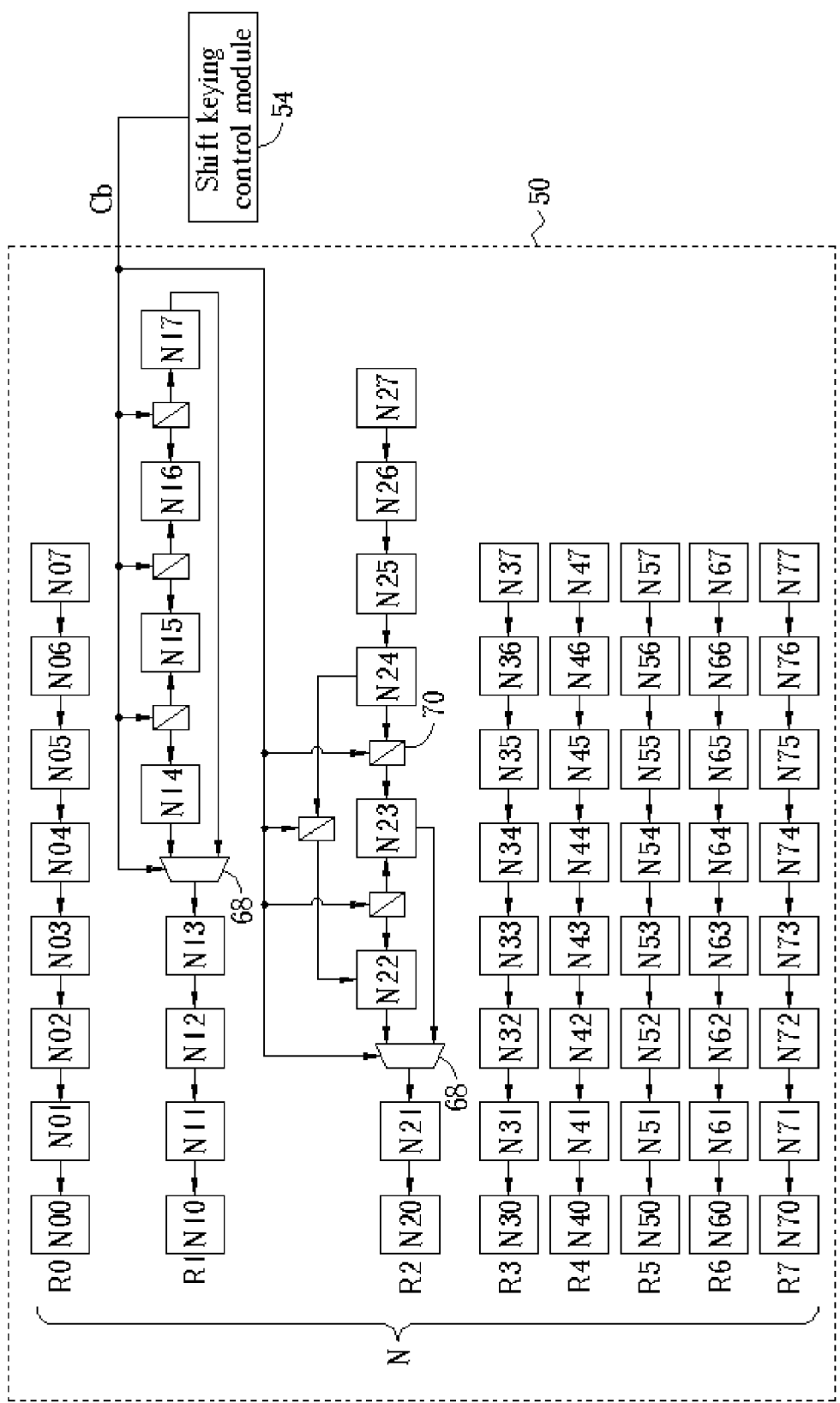
FIG. 14 is a implementation diagram of the register module in FIG. 4.

Contrarily, in order to process the serial scanning by the scanning sequence shown in FIG. 10, the scanning order of each data element is uncertain prior to its right side data elements. As FIG. 10 illustrates, in the second row, the scanning orders of the data element Q14, Q15, Q16, and Q17 from left to right are 17, 16, 15, and 14. Similarly, in the third row, the scanning orders of the data element Q22 and Q23 are 19 and 18. In order to fit the bit shift method of the bit plane N to the scanning sequence in FIG. 10, the register module 50 of the present invention can be constructed as the circuit in FIG. 14. As FIG. 14 illustrates, aimed at the row R1 and R2 of the bit plane N, the present invention includes a related multiplexer 68 and a shift keying controller 70 for controlling bit shift directions to achieve different shift control, so that the register module of the present invention can change to support all scanning sequences in FIG. 9 to FIG. 11. The shift keying control module 54 of the present invention can change the bit shift method by a one-bit control signal Cb.

Figure 15:
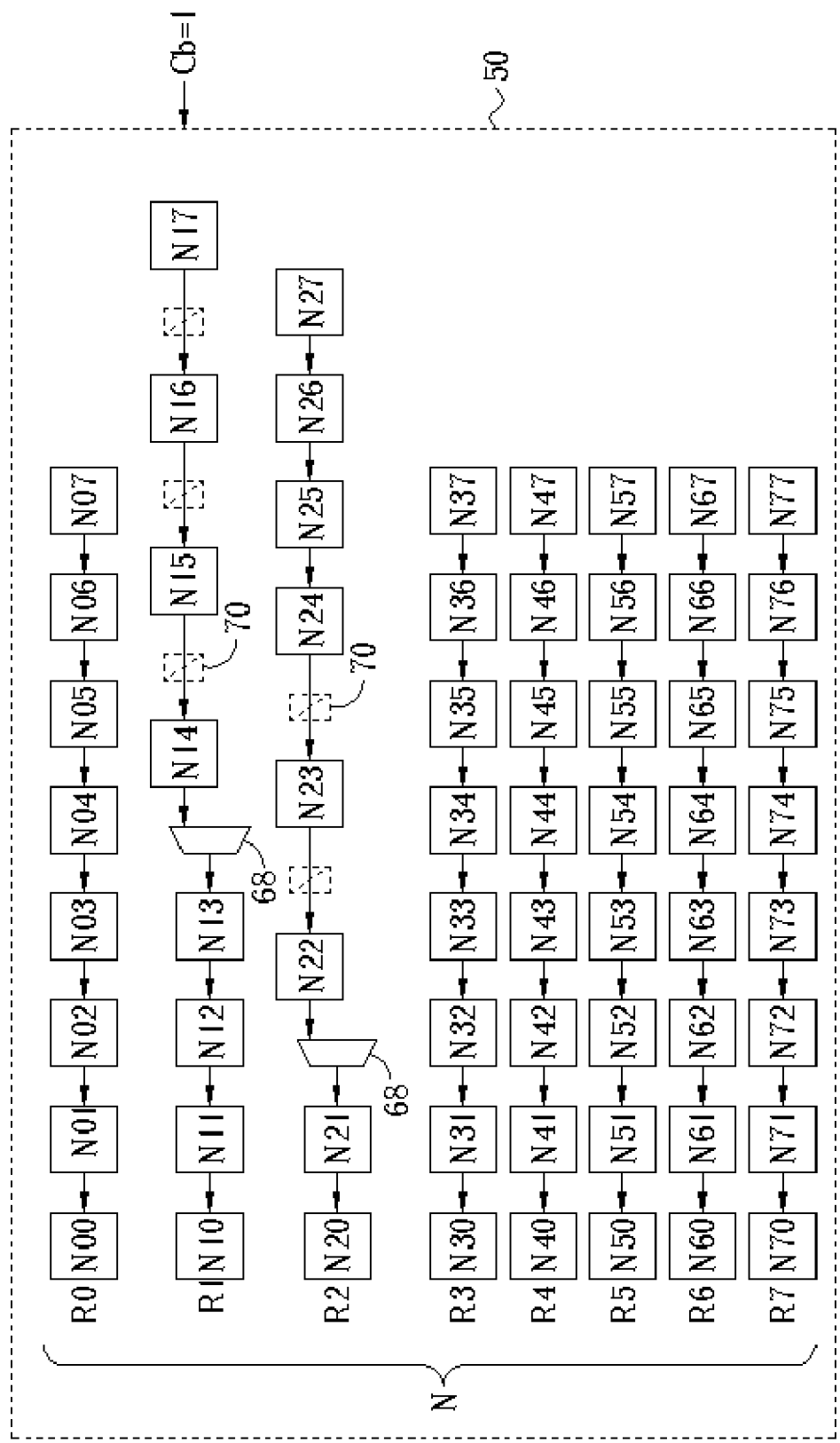
FIGS. 15, 16 illustrate that the register module in FIG. 14 processes shift keying in different conditions.
Figure 16:
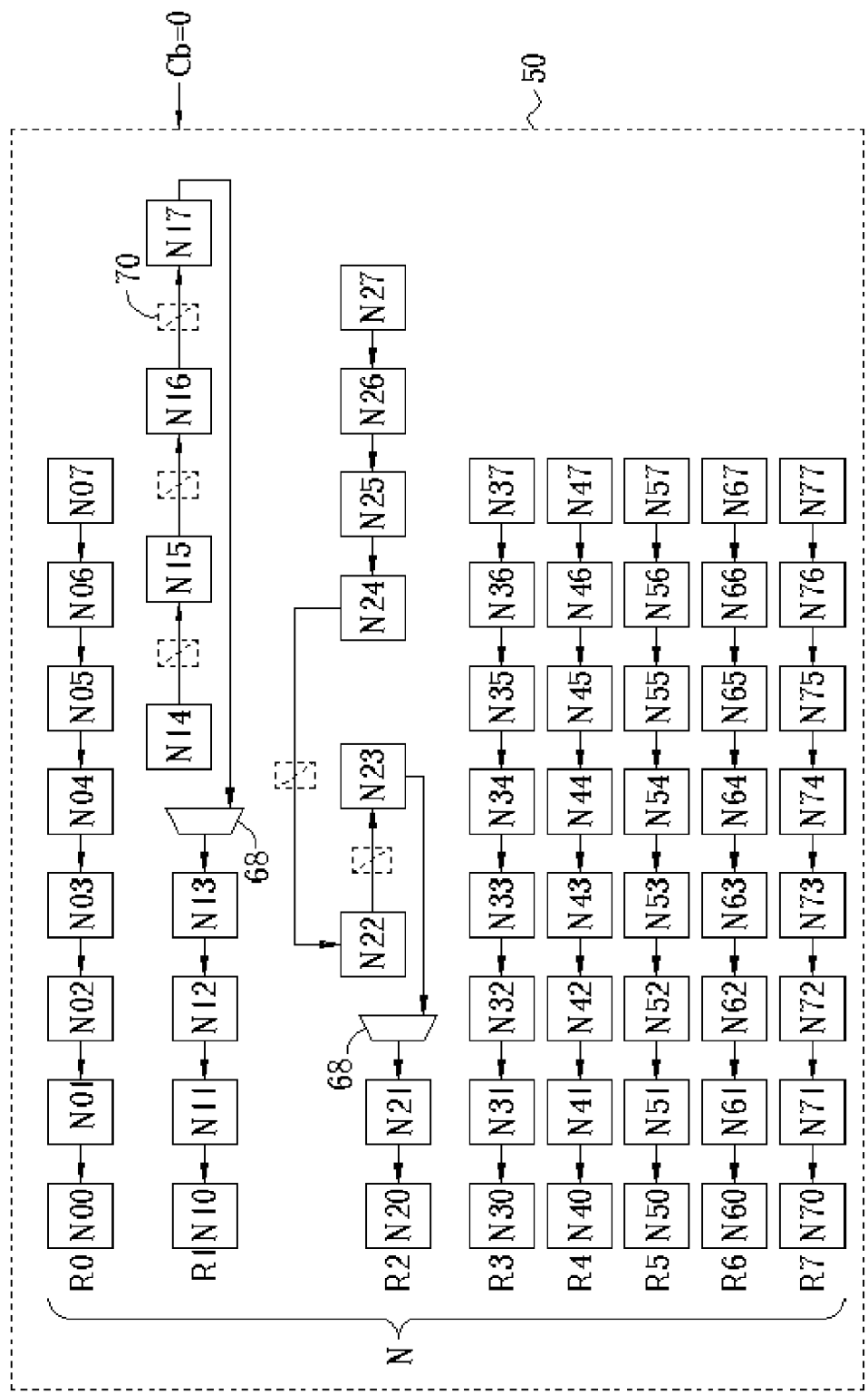

Please refer to FIG. 15, FIG. 16 (and FIG. 14). FIG. 15 and FIG. 16 illustrate that the register module 50 processes bit controls in different situations in FIG. 14. As FIG. 15 illustrates, when the control signal Cb is digit "1", the bit shift direction is toward left (omitted unable bit shift directions), so that the present invention can control memory access in the serial scanning by the scanning sequences in FIG. 9 and FIG. 11. On the other hand, when the control signal Cb is digit "0"1, its enabled bit directions are shown in FIG. 16 to support refreshing of the bit plane N when the serial scanning goes by the scanning sequence shown in FIG. 16. Corresponding to the scanning sequences of the data element Q14 to Q17 in the second row, the bits N14 to N17 undergo bit shifts by shifting toward the right side; in other words, the bit N17 first shifts to the most left side of the row R1, and then the bit N16, N15, and N14 go after. Similarly, the bits N22 and N23 of the row R2 fit the data element Q22 and Q23 by shifting toward the right side. That is to say, when processing the serial scanning based on the sequence in FIG. 10, the present invention can shift bits in a simple way to access bits corresponding to each data element, and control access of the data element in the inner memory 52 accordingly.

Figure 17:
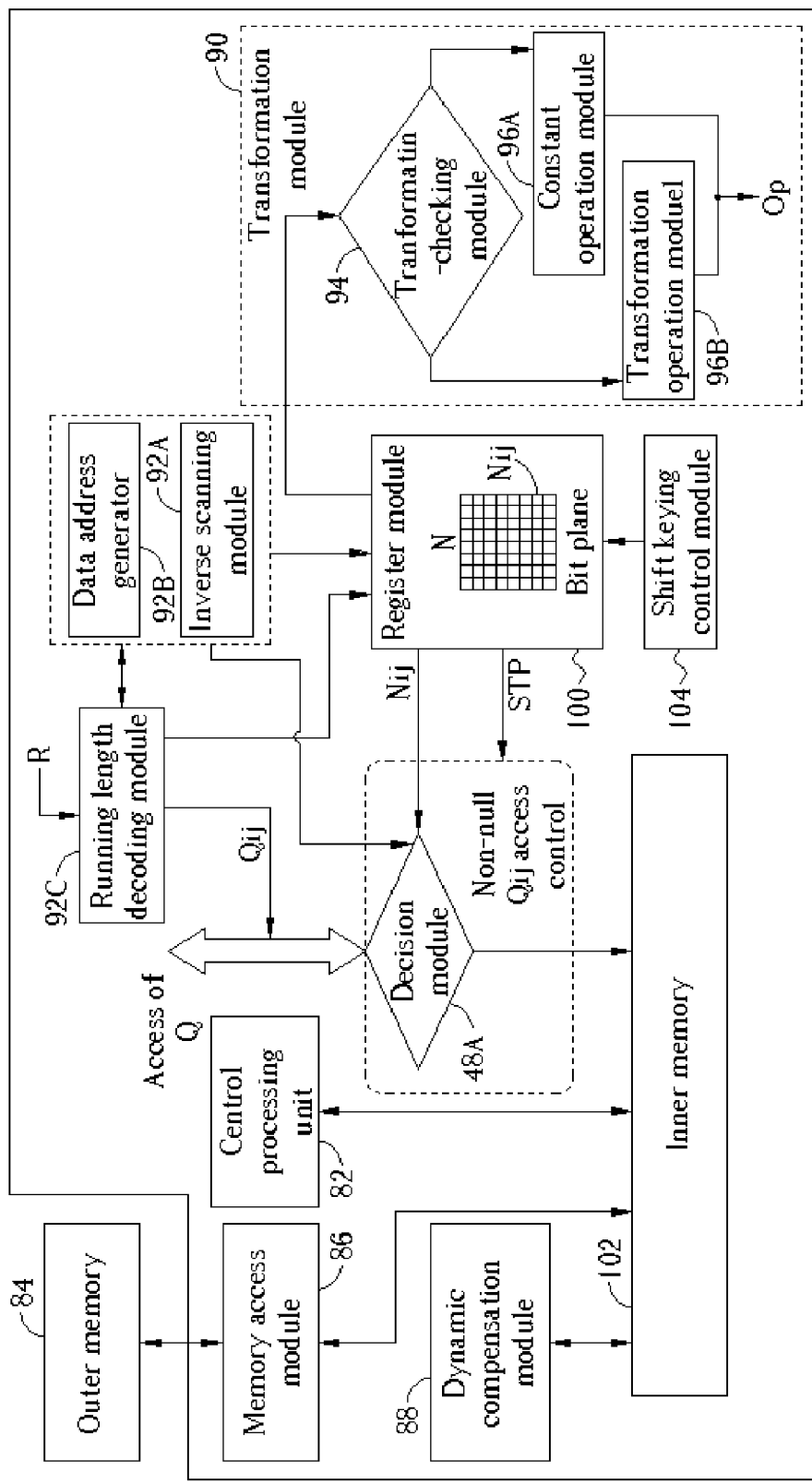
FIG. 17 is another implementation function block diagram of the present invention.

Please refer to FIG. 17. FIG. 17 illustrates another implementation function diagram of the present invention, a processing circuit 80. The processing circuit 80 can decompress compressed image data, and includes a central processing unit 82, a memory access module 86, an inner memory 102, a dynamic compensation module 88, an inverse scanning module 92A, a data address generator 92B, a variable length decoding module 92C, and a transformation module 90. To match operations of the present invention, the processing circuit 80 further includes a register module 100, a shift keying control module 104, and a decision module 98. The central processing unit 82 controls operations of the processing circuit 80, and the memory access module 86 accesses an outer memory 84. Besides, the variable length decoding module 92C, the data address generator 92B, and the inverse scanning module 92A can decode one-dimensional data matrix R (please refer to FIG. 2) to two-dimensional quantized frequency domain data matrix Q. After de-quantizing the data matrix Q, the transformation module 90 can process an inverse frequency-domain transformation (such as inverse discrete cosine transformation) to generate corresponding pixels of a block matrix, and the dynamic compensation module 88 can process a dynamic compensation to decompress image data. The inner memory 102 supports memory resources of the above module operations.

As the variable length decoding module 92C, the data address generator 92B, and the inverse scanning module 92A operate, the one-dimensional data matrix R after running length coding and Huffman coding is decoded to a one-dimensional data matrix S (in FIG. 2) to generate each data element Qij. After the inverse scanning, data elements of the one-dimensional data matrix S are rearranged to a two-dimensional data matrix Q, and the data matrix Q is stored into the inner memory 102 for following de-quantization/inverse frequency-domain transformation. When the data matrix Q is stored into the inner memory 102, the present invention can generate a corresponding bit plane N in the register module 100, and the decision module 98 can determine nulls of the data element Qij based on each bit of the bit plane N, and determine whether it should be written into the inner memory 102. As the variable length decoding module 92C, the data address generator 92B, and the inverse scanning module 92A finish decoding the data element Qij, it can be sure whether is there any null in the data element Qij. Furthermore, the bit Nij of its corresponding bit plane N can be confirmed, and stored into the register module 100 by bit shifts. Meanwhile, the decision module 98 can decide whether the data element Qij be should written into the inner memory 102 based on the bit Nij. If the data element Qij is null, it is prevented from being written into the inner memory 102, achieving one goal of the present invention to reduce access to the inner memory 102.

After the data matrix Q is stored in the inner memory 102, its corresponding bit plane N is complete. When reading the data matrix Q and processing de-quantization, the decision module 98 of the present invention can decide that whether its corresponding data element Qij should be read from the inner memory 102 based on each bit Nij of the bit plane N. If a bit Nij corresponding to some data element Qij represents that the data element is null, the decision module 98 does not read the data element Qij (actually, the data element is not stored in the inner memory 102), and it can cooperate with the data address generator 92B and its generated address information to finish dealing with the data element Qij. Therefore, the present invention can reduce access time of the inner memory 102 by controlling access to non-null data element Qij.

Figure 18:
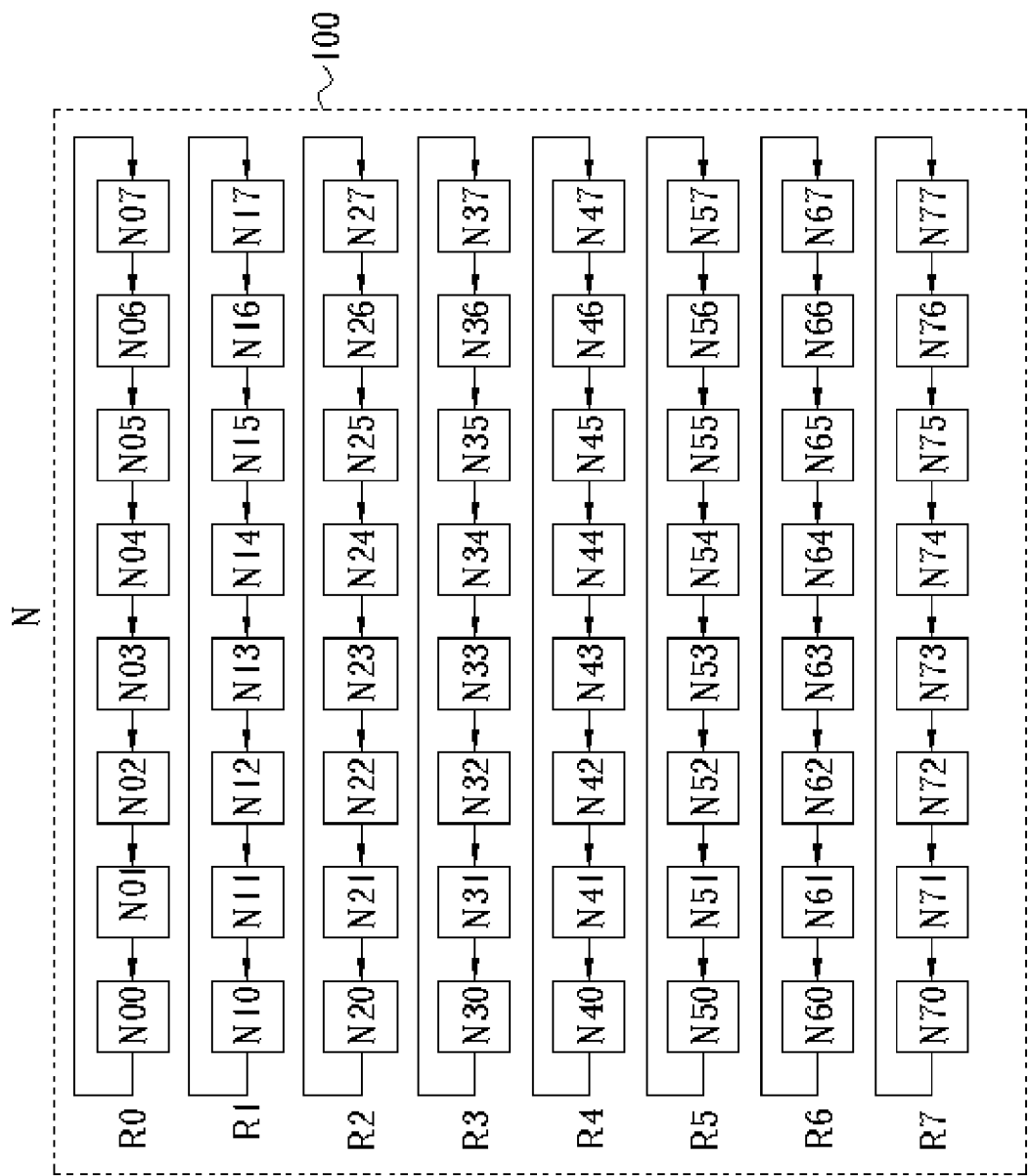
FIG. 18 is a schematic diagram of shift keying by rotation method in FIG. 17.

When processing the above de-quantization, the present invention can keep bit plane information by a rotational bit shift method. Please refer to FIG. 18. FIG. 18 illustrates a register module 100 implementation diagram of the rotational bit shift method. For example, when reading the data element Q00 to Q07 of the first row, the decision module 98 can determine practical reading of the data element Q00 by the leftmost bit of the row R0. After that, each bit of the row R0 shifts a bit to the left to make the bit corresponding to the data element Q01 to shift to the leftmost side of the row R0, and the bit corresponding to the data element Q00 shifts to the rightmost side of the row R0 by the rotational method. Following that, when processing reading of the data element Q01, the decision module 98 still can determine the reading of the data element Q01 based on the leftmost bit of the row R0 (since its corresponding bit has been shifted to the most left side of the row R0). After processing the data element Q01, each bit of the row R0 shifts toward the left similarly, and the bit corresponding to the data element Q01 again shifts to the rightmost side of the row R0 by the rotational method. Therefore, after processing readings of the data elements Q00 to Q07, the row R0 of the bit plane N just rotates to the initial condition (the original condition when the bit plane N is just set up) to keep information of the row R0. In this way, after processing each reading of the data element Qij, the bit plane N still keeps all corresponding information.

By the information provided by the bit plane N, the present invention can further simplify the inverse transformation when processing inverse frequency-domain transformation. Those skilled in the art will recognize that processing two-dimensional inverse frequency-domain transformation is equivalent to processing one-dimensional inverse frequency-domain transformation twice. When the one-dimensional inverse frequency-domain transformation progresses, if there are only direct current frequency domain data elements that are non-nulls in some row, and other alternating current frequency domain data elements are all nulls, the one-dimensional output matrix provided by the one-dimensional inverse frequency-domain transformation is a constant matrix (that is, each element is a constant). In the present invention, because the bit plane N has already recorded null conditions of each frequency domain data element, it can use the information provided by the bit plane N to make sure that if each row of the frequency domain data matrix has the above-mentioned characters.

As FIG. 17 illustrates, in the processing circuit 80 of the present invention, two-dimensional inverse frequency-domain transformation is performed by the transformation module 90, and the transformation module 90 includes a transformation-checking module 94, a constant operation module 96A, and a transformation operation module 96B for the one-dimensional inverse frequency-domain transformation. When some row of the frequency domain data matrix undergoes the one-dimensional inverse frequency-domain transformation, the transformation-checking module 94 can check if there are only direct current frequency domain data elements that are non-nulls in the row by its corresponding row in the bit plane N, or if there is only the leftmost bit in the corresponding row of the bit plane N that is null. In the above situation, the row of the frequency domain data matrix has only direct current frequency domain quantities, and other alternating current frequency domain quantities are nulls. The one-dimensional output matrix provided by the one-dimensional inverse frequency-domain transformation should be a constant matrix. At this time, the constant matrix can be generated by the constant operation module 96A as an output matrix Op of one-dimensional inverse frequency-domain transformation. Relatively, if the corresponding row of the bit plane N has non-null alternating current frequency domain data elements, the transformation operation module 96B processes the one-dimensional inverse frequency-domain transformation to generate corresponding output matrix Op.

Please refer to FIG. 19 (and FIG. 17). FIG. 19 illustrates the process of the above-mentioned one-dimensional inverse frequency-domain transformation by an algorithm. If frequency domain data element Bm0, Bm1 ... Bm7 (m is a constant) of some row undergo the one-dimensional inverse frequency-domain transformation, bit Nm0, Nm1 .... Nm7 of the bit plane corresponding to the above frequency domain data elements represent null conditions of the frequency domain data elements. During the one-dimensional inverse frequency-domain transformation, the present invention can check if all the alternating current frequency domain data elements are nulls by these corresponding alternating current frequency domain data elements, the bit Nm1, Nm2 ... Nm7. If true, elements Op0, Op1 to Op7 of the output matrix Op are set as a constant C0 (this constant can be generated by the constant operation module 96A). If false, the transformation operation module 96B processes a one-dimensional inverse frequency-domain transformation to generate the output matrix Op. The output matrix of the constant operation module 96A or the transformation operation module 96B undergoes another one-dimensional inverse frequency-domain transformation, and then the corresponding block of the frequency domain data matrix is gained.

To sum up, in the process of image data de-/compression (or de-/coding), the inner memory of the processing circuit is necessary to process access of a frequency domain data matrix. This frequency domain data matrix is usually a sparse matrix with many null data elements. However, in prior art techniques, this character is not used, so that each data element of the frequency domain data matrix should access the inner memory, which costs a lot of memory resources and increases the inner memory bandwidth demand.

In comparison to the prior art, the present invention registers a bit plane by a register module formed by a simple shift keying register, and each bit of the bit plane records null conditions of each frequency domain data element correspondingly. Therefore, it can access each bit of the bit plane by the bit shift method fast and conveniently, check if each frequency domain data element is null based on the bit plane information, control inner memory access of the frequency domain data, and make the process of image data de-/compression more speedy. In the implementation mentioned from FIG. 4 to FIG. 16, the present invention prevents access of the null frequency domain data elements from occupying the inner memory resources based on the bit plane information, and makes the serial scanning process faster. Similarly, in the implementations of FIG. 17 and FIG. 18, the bit plane information makes the null frequency domain data element not to be written into the inner memory, and makes the inverse frequency-domain transformation faster. According to the sparse character of the frequency domain data matrix, the present invention releases a lot of memory resources in the process of image data de-/compression, and reduces the inner memory bandwidth demand and related power dissipation, so that costs of designing and producing related processing circuits can be curtailed, and efficiencies promoted. In each implementation of the present invention, each module can be achieved by hardware circuits, or achieved by processing firmware programs in the central processing unit of the processing circuit. The above-mentioned processing circuits 30 and 80 can be combined as a single processing circuit including de/compression functions. For example, the decision modules of the processing circuit 30 and 80 can be combined to a decision module, which controls access of non-null data elements in the inner memory when de/compressing. Similarly, it can also register the bit plane by one register module in the de/compression process.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A data coding/decoding method comprising:
   reading a frequency-domain matrix, the frequency-domain matrix comprising a plurality of frequency-domain elements;
   providing a reference matrix comprising a plurality of reference elements each corresponding to a frequency-domain element, each reference element representing whether its corresponding frequency-domain element fits a default or not; and
   taking a transformation step for generating an output matrix based on the frequency-domain matrix, the transformation step comprising:
   taking a transformation checking step for checking if the reference matrix fits a default matrix; if the reference matrix does not fit the default matrix, a corresponding output matrix is generated by proceeding to a transformation operation for the frequency-domain matrix; and
   if the reference matrix fits the default matrix, the frequency-domain matrix is prevented from undergoing the transformation operation and the output matrix is a constant matrix.

2. The data coding/decoding method of claim 1 wherein at least one frequency-domain element is a direct current frequency-domain element and other frequency elements are alternating current frequency-domain elements among the plurality of frequency-domain elements; wherein when the reference matrix fits the default matrix, each reference element corresponding to each alternating current frequency-domain element in the reference matrix represents that the alternating current frequency-domain element fits the default.

3. The data coding/decoding method of claim 2 further comprising:
   when the reference matrix fits the default matrix, a constant operation step is performed for generating the constant matrix by working out a constant value based on the direct current frequency-domain element so that a plurality of elements of the constant matrix equal the constant value.

4. The data coding/decoding method of claim 1 wherein the default is null.

5. The data coding/decoding method of claim 1 wherein the transformation operation is an inverse discrete cosine transformation.

6. A processing circuit for data coding/decoding comprising:
   a memory capable of storing a frequency-domain matrix, the frequency-domain matrix comprising a plurality of data elements;
   a register module for storing a reference matrix wherein the reference matrix comprises a plurality of reference elements each corresponding to a frequency-domain element, each reference element for representing whether its corresponding frequency-domain element fits a default or not; and a transformation module for providing a corresponding output matrix based on the frequency-domain matrix, the transformation module comprising:

a transformation operation module; and a transformation checking module for checking if the reference matrix fits a default matrix; wherein if the reference matrix does not fit the default matrix, the transformation checking module triggers the transformation operation module to proceed to a transformation operation for generating a corresponding output matrix, and if the reference matrix fits the default matrix, the transformation checking module is prevented from triggering the transformation operation module to proceed to the transformation operation for generating a corresponding output matrix and the output matrix is a constant matrix.

7. A processing circuit for data coding/decoding of claim 6 wherein at least one frequency-domain element is a direct current frequency-domain element and other frequency elements are alternating current frequency-domain elements among the plurality of frequency-domain elements; wherein when the reference matrix fits the default matrix, each reference element corresponding to each alternating current frequency-domain element in the reference matrix represents that the alternating current frequency-domain element fits the default.

8. The processing circuit for data coding/decoding of claim 7 further comprising:

a constant operation module; wherein when the reference matrix fits the default matrix, the transformation checking module triggers the constant operation module to generate a constant value and the constant matrix based on the direct current frequency-domain element so that a plurality of elements of the constant matrix equal the constant value.

9. The processing circuit for data coding/decoding of claim 6 wherein the default is null.

10. The processing circuit for data coding/decoding of claim 6 wherein the transformation operation module is capable of performing an inverse discrete cosine transformation.

* * * * *